US005442759A

United States Patent [19]
Chiang et al.

[11] Patent Number: 5,442,759
[45] Date of Patent: Aug. 15, 1995

[54] INTERACTIVE ONLINE TUTORIAL SYSTEM WITH USER ASSISTANCE FUNCTION FOR SOFTWARE PRODUCTS

[75] Inventors: Alice Chiang, Portola Valley; Kevin M. McBride, Menlo Park; Calvin C. Yee, Fremont, all of Calif.

[73] Assignee: International Business Machines Corporation, Armonk, N.Y.

[21] Appl. No.: 164,485

[22] Filed: Dec. 9, 1993

Related U.S. Application Data

[63] Continuation of Ser. No. 858,378, Mar. 26, 1992, abandoned.

[51] Int. Cl.⁶ ............................................. G09B 19/00
[52] U.S. Cl. .................... 395/375; 434/118; 364/DIG. 1; 364/DIG. 2; 364/226.2; 364/286; 364/286.1; 364/286.2; 364/920.1; 364/948.2; 364/948.21; 364/948.22
[58] Field of Search ................. 434/118, 323, 18, 337, 434/156, 157, 332; 364/157, 156, DIG. 1 MS File, DIG. 2 MS File, ; 395/500, 375, 155, 156, 157, 159, 160, 161

[56] References Cited

U.S. PATENT DOCUMENTS

| | | | |
|---|---|---|---|
| 4,622,013 | 11/1986 | Cherchio | 434/118 |
| 4,637,797 | 1/1987 | Whitney et al. | 434/118 |
| 4,772,206 | 9/1988 | Kerr et al. | 434/118 |
| 4,941,829 | 7/1990 | Estes et al. | 434/118 |
| 5,035,625 | 7/1991 | Munson et al. | 434/332 |
| 5,038,316 | 8/1991 | Hempleman | 364/900 |
| 5,228,859 | 7/1993 | Rowe | 434/118 |

OTHER PUBLICATIONS

"IBM OS/2TM Programming Tools and Information 1.3", Programming Guide, First Edition, Sep. 1989, International Business Machines Corporation.
Windows 3.1, wintutor.exe Mar. 2, 1992, Microsoft Corp.

*Primary Examiner*—Robert B. Harrell
*Attorney, Agent, or Firm*—Baker, Maxham Jester & Meador

[57] ABSTRACT

An interactive online tutorial system is disclosed for providing instruction in the use of a software product operating on a data processing device. The data processing device including an instruction processing unit or CPU, a data storage resource, an input system for receiving input from a user via a mouse or keyboard, and an output system for generating output images on a video display. The tutorial system includes a first display control for generating a tutorial window in a first portion of the video display. A second display control is provided for generating a product window in a second portion of the video display. A tutorial presentation system selectively generate a plurality of tutorial text panels in response to input from the input system. The tutorial text panels include one or more lesson panels and one or more step panels associated with each lesson panel. A tutorial panel linking system links the lesson panels through a series of sequential links and links the lesson panels and their associated step panels through a series of hierarchical links. A series of tutorial panel selectors are provided for selectively activating from a lesson or step panel a link to another lesson or step panel in order to display the linked panel.

21 Claims, 14 Drawing Sheets

| Command | Parm 1 | Parm 2 | Parm 3 | Parm 4 | Parm 5 | Data 1 |
|---|---|---|---|---|---|---|
| MENU_SELECT | pull-down choice | pull-down name | window name | ClientArea FID_CLIENT | parent window name | |
| USER_INPUT | entry field name | | dialog box name | " | " | "text" |
| DLG_BUTTON | button name | | dialog box name | " | " | |
| MAX_WINDOW | | | window name | " | " | |
| MIN_WINDOW | | | window name | " | " | |
| NET_CLICK1 | | | window name | " | " | "object name" |
| NET_CLICK2 | | | window or dlgbox name | " | " | "object name" |
| LIST_CLICK1 | | FID_CLIENT or list box name | window or dlgbox name | " | " | "item name" |
| LIST_CLICK2 | | FID_CLIENT or list box name | window or dlgbox name | " | " | "item name" |

INTERACTIVE ONLINE TUTORIAL SYSTEM WITH USER ASSISTANCE FUNCTION FOR SOFTWARE PRODUCTS

This is a continuation of application Ser. No. 07/858,378, filed Mar. 26, 1992, now abandoned.

BACKGROUND OF THE INVENTION

The present invention relates generally to tutorial systems for providing instruction in the operation of software products. More particularly, the invention pertains to online tutorial systems wherein software product training is provided interactively by guiding the user through one or more examples of product operation. Still more particularly, the invention involves a computer implemented, interactive tutorial system providing online instruction, monitoring and assistance in conjunction with a contemporaneously operating software product.

As software developers strive to provide ever more versatile and powerful products, the task of becoming proficient in the use and implementation of such products becomes increasingly difficult. Even for those users who consider themselves computer "literate", days and sometimes weeks of instruction may be required before the user is able to take full advantage of functional capabilities offered by many software products. In such cases, the quality of the instructional materials accompanying the software may be nearly as important as the product in ensuring ultimate user satisfaction.

Software instructional materials for prior art products fall into two general types. On one hand are product documentation materials, such as printed manuals and online product description files. These materials provide textual descriptions of operational features of the product. They may also include examples of product operations. Although documentation of this nature may be adequate for reference purposes, such materials are not particularly suitable for providing initial instruction in the use of a product. Most users would rather use the product directly than spend hours reading ancillary instructional materials. Accordingly, a number of products follow a learn-by-doing approach using interactive tutorial materials, which represent a second category of instructional materials.

Unlike product documentation materials, tutorials provide instruction in a manner which gives the user an opportunity to gain practical experience in the context of solving actual problems. Both online and workbook-based tutorials have been proposed wherein the user is guided through a presentation of one or more examples or problems in a sequence of lessons. In workbook-based systems the student performs specified actions on the product in accordance with a lesson plan set forth in a printed workbook. Online systems work in a similar fashion except that the tutorial lessons are displayed sequentially on-screen. In addition, online tutorials typically include the capability of monitoring student actions and advising when a mistake has been made. Moreover, if the user requires assistance, a preprogrammed demonstration can be requested to perform the correct action(s) to be taken. For these reasons, online tutorials represent the most promising avenue for providing instruction in the operation of software products.

Most prior art online tutorial systems allow users to interact with a simulation of the software product of interest. This approach to tutorial instruction is both inefficient and costly. The software designer must not only code and debug the application product itself but also the duplicative simulation code for the tutorial. The simulation code must be periodically updated and maintained as the product changes, all at additional time and cost. The effectiveness of simulation tutorials as a teaching vehicle is also open to question. Simulation tutorials provide only limited product interaction because the simulations can only emulate the user interface of the product and do not have full capabilities in processing user actions. The user is not afforded direct experience with the product and thus may be deprived of a full and accurate understanding of product characteristics. Because only a partial view of the product is provided, users are unable to explore other portions of the product or learn on their own beyond what the tutorial covers.

As a solution to the inefficiencies of simulation tutorials, several systems have been proposed wherein online tutorial instruction proceeds in conjunction with the operation of the product to be taught. The prior art includes interactive tutorials implemented in single task operating systems in which special hardware or software subsystems are required to control the environment and provide tutorial information. This special hardware and software includes such things as interrupts between the user and operating system, processing outside the operating system, and external information presentation hardware. As a result, the flexibility and efficiency of these tutorial products is relatively limited. For example, the information presentation function in many prior art tutorial systems is provided in a strict top down sequence which must be followed in the order set forth. No provision is made for selectively controlling the level of tutorial information detail presented as the student works through the lesson. In other cases, the input monitoring function of prior art tutorial systems is unduly restrictive insofar as literal input response from the student is required. No provision is made for allowing the student to provide input to the computer for performing tasks which are non critical to the product. Finally, in other prior art tutorial systems wherein a demonstration mode is provided, no provision is made for selectively controlling the duration of the automated control sequence. Typically, the demonstration sequence encompasses a predetermined number of input steps.

The foregoing disadvantages of prior art tutorial systems stem in part from limitations inherent in single task operating systems and in user interface software that provides only limited control functionality. Recent advances in software technology offer opportunities to create tutorial products with better user interfaces and more sophisticated program control without undue product complexity. The OS/2 TM operating system from IBM Corporation provides a multi-tasking environment wherein multiple products can be run concurrently within the operating system. The OS/2 TM operating system includes a set of programming resources referred to as the application program interface (API). The API in turn provides a subset of support routines collectively referred to as the Presentation Manager TM API, which allows applications to run in rectangular subdivisions of the display called windows. Each windowed application can share the screen with other windowed applications. Each includes a graphics-based user interface to present visual controls for managing, via mouse and keyboard input, the application and files installed and running under OS/2. Each window further includes a display area for outputting application generated text and graphics. The OS/2 ™ operating system also provides a message exchange network which permits applications to communicate with each other via message passing protocols.

Accordingly, there exists in an improved computing environment a need to provide an online tutorial system that is operable in conjunction with a software product of interest. This need offers a unique opportunity to improve upon prior art tutorial systems by offering characteristics and features not provided by the tutorial systems noted above. The challenge for software developers is how to use these facilities to present information effectively.

SUMMARY OF THE INVENTION

The present invention is directed to a computer implemented tutorial system that supports direct user interaction with a software product concurrently executing with the tutorial. The tutorial system controls the resources of a data processing device to present tutorial lesson information, monitor user input and provide input assistance upon request. In a preferred implementation of the invention, the data processing device includes an instruction processing unit or CPU, a data storage resource, an input system for receiving input from a user via a mouse or keyboard, and an output system having a video display.

The tutorial system includes a display initialization system for generating a tutorial display window in a first portion of the video display and product display window in a second portion of the display. The tutorial system further includes a tutorial presentation system for controlling the presentation of tutorial information in the tutorial display window in response to user input requests. Tutorial information is presented by the presentation system through a series of linked information display panels including lesson panels, step panels and concept panels. Each lesson panel contains overview information and a menu of step selections. The lesson panels are linked sequentially to other lesson panels. They are also linked hierarchically to step panels listed in the lesson panel menu such that the step panels may be selectively activated from within an associated lesson panel. Each step panel sequentially lists and describes one or more user input actions for controlling the product to be learned. Each step panel is also linked sequentially to other step panels, which may be selectively activated from within an active step panel. A third category of information display is provided by a plurality of concept panels which are linked to associated lesson panels and have a parallel relationship therewith. The information presentation system includes a control system responsive to mouse and keyboard inputs for selectively displaying lesson, step and concept panels.

In a further aspect of the invention, the tutorial system includes an input monitoring system for preventing erroneous input from reaching the concurrently executing software product. The monitoring system utilizes a lesson control file containing input actions corresponding to actions described in the step panels of the information presentation system. These actions are arranged hierarchically and identified by a lesson, step and action numbers. The monitoring system compares user inputs with expected input actions defined in the lesson control file. Upon a match, a message containing the appropriate input is allowed to reach the product. If a mismatch occurs, an error message is generated. The monitoring system may also include one or more lookup tables containing input actions which the user could take that are not critical to the product. Such actions would include controlling the information presentation system or performing noncritical actions within the product itself, such as window sizing and scrolling, or looking at pull down menus and other product features. These functions should not be inhibited by the tutorial monitoring system.

In a still further aspect of the invention, the tutorial system includes a user assistance system for selectively driving the product to perform the actions of a lesson. The user assistance system utilizes the lesson control file described above to send messages to the product corresponding to input actions defined by the lesson control file. Because the lesson control file is structured hierarchically, the user can selectively drive the product to perform one or more actions, one or more steps or an entire lesson. These actions can be requested from the display panels of the information presentation system, which include appropriate command icons that may be activated by mouse or keyboard input.

BRIEF DESCRIPTION OF THE DRAWING

The foregoing and other features, objects and advantages of the invention will be apparent from the following detailed description when considered in conjunction with the accompanying drawings, in which:

FIG. 7 is a table showing selected command types and associated parameters from a lesson control file utilized by the tutorial system of FIG. 1;

DETAILED DESCRIPTION OF THE PREFERRED EMBODIMENT

Overview

The invention will now be described in detail in relation to a preferred embodiment and implementation thereof which is exemplary in nature and descriptively specific as disclosed. As is customary, it will be understood that no limitation of the scope of the invention is thereby intended, and that the invention encompasses such alterations and further modifications in the illustrated device, and such further applications of the principles of the invention illustrated herein, as would normally occur to persons skilled in the art to which the invention relates.

Figure 1:
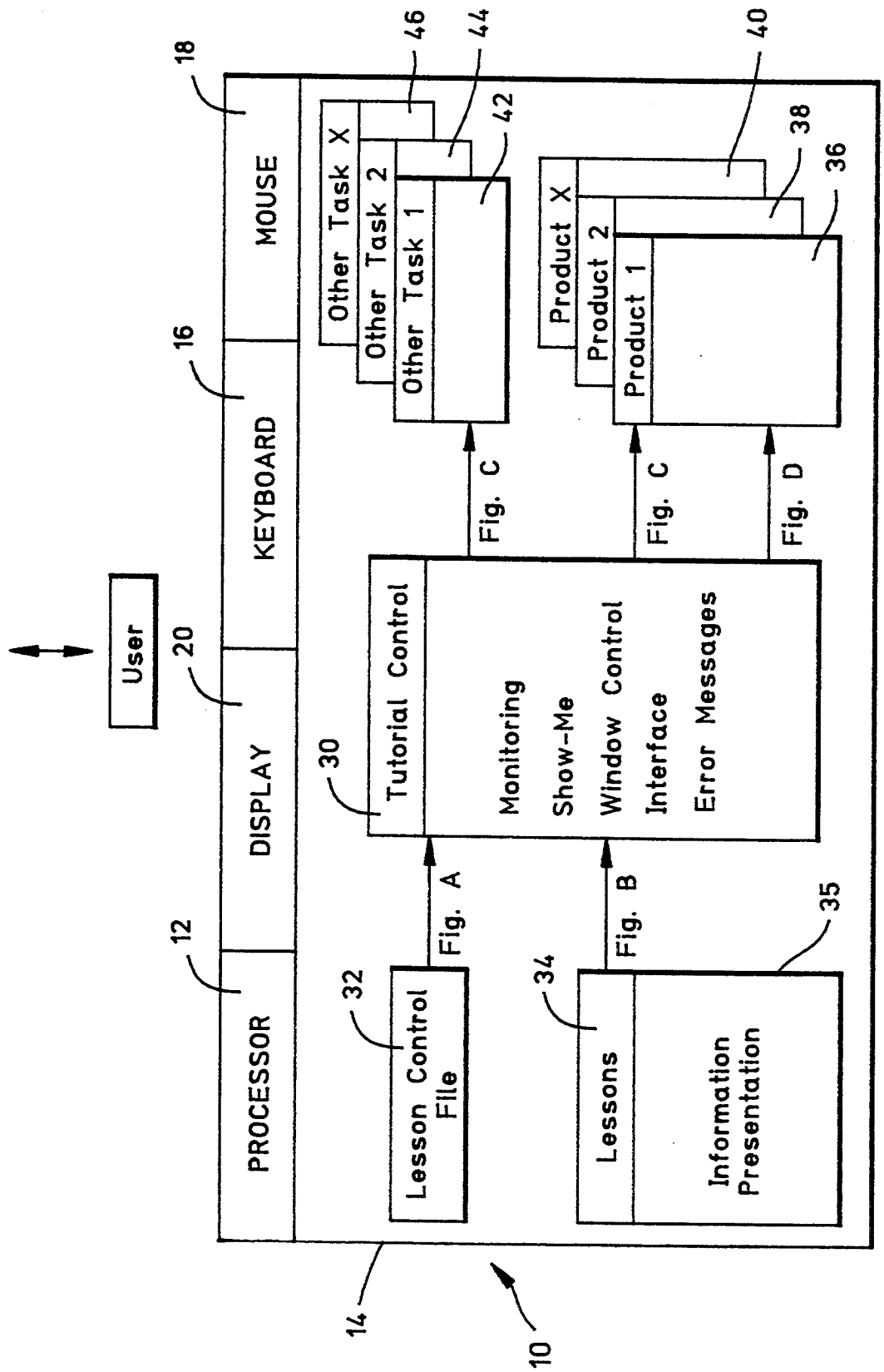
FIG. 1 is a block diagram showing an interactive tutorial system constructed in accordance with the present invention.

Thus, with reference now to FIG. 1 there is illustrated diagrammatically a data processing system 10 which may be conventionally embodied as one of the IBM family of personal computers, including the IBM Personal System/2 TM and the Personal Computer AT TM, among others. The data processing system 10 includes an instruction processing unit ("Processor") or CPU 12, a data storage resource 14, an input system for receiving input from a user via a keyboard 16 or mouse input device 18, and an output system for generating output images on a video display 20. Stored within the data storage resource 14 are a series of machine readable instruction sets for providing an interactive online tutorial system. The tutorial system includes a tutorial control module 30 which utilizes a lesson control file 32, a lesson display file 34 and an information presentation system 35 to provide tutorial instructions in the use of one or more products 36, 38 and 40. The tutorial control module 30 also permits the user to perform additional tasks 42, 44 and 46 which are unrelated to the products 36, 38 and 40. The products 36, 38 and 40 represent interactive software applications which are concurrently executing with the interactive online tutorial system. Such products could include software tools intended for concurrent use in order to perform some higher task. IN that case, the tutorial would provide instruction in the concurrent use of the products. That tasks 42, 44 and 46 represent other products concurrently running under the operating system which are not being taught by the tutorial.

The tutorial system performs three major functions: information presentation, monitoring and demonstration assistance or "show-me". In the preferred embodiment, the tutorial system operates in the environment of a multi-tasking operating system running on the data processing device 10. The OS/2 TM operating system from IBM is preferred. It provides a multi-tasking, graphical and windowing environment which allows the tutorial system to operate concurrently with one or more products to be learned. In this multi-tasking environment, lesson information can be presented in one portion of the display 20 while the products can be displayed in another portion of the display. These display portions are conventionally known as windows. To provide this windowed environment, a set of OS/2 programming resources referred as the application program interface (API) may be advantageously utilized. In particular, a subset of API support routines collectively referred as the Presentation Manager TM API is invoked. The OS/2 TM operating system and its various API resources, including the Presentation Manager TM API, have been extensively documented (see, e.g., IBM Programming Guide, Operating System/2 Programming Tools and Information, Version 1.2 (September 1989)).

Persons skilled in the art will appreciate that the OS/2 TM operating system and its Presentation Manager TM API provide a multi-tasking windowed environment wherein one or more applications can operate concurrently within their own windows. A multi-tasking operating system such as the OS/2 TM operating system is to be distinguished from a single-task operating system. In single-task operating systems, programs cannot be executed concurrently in a protected mode wherein data integrity is maintained between programs. In single-task systems, processes sharing computer resources must be operated as co-routines. A co-routing is a subroutine which, when called again after an execution, resumes at the return point of its previous execution. In contrast, multi-tasking provides a mode of operation that employs concurrent or interleaved execution of two or more tasks by a single processor such that processes take place within a common interval of time during which they alternately share common processor resources.

In the OS/2 TM operating system, there are three levels of multi-tasking: sessions, processes and threads. A session is the top-level object in the multi-tasking hierarchy. A session usually consists of a process, a logical display screen, and logical input device. The OS/2 TM operating system can run several sessions concurrently and the users can switch between them. The session with which the user interacts is called the foreground session. All other sessions continue to run but receive no input from the user. A process is an execution application plus the resources it uses. A thread is an executable unit contained in a process. Processes and threads can both run concurrently. Thus, at all levels of multi-tasking, concurrent program execution is provided and there is no requirement for co-routining as in single-task operating systems.

In the present invention, a tutorial program and one or more application programs to be learned are run concurrently in separate Presentation Manager TM sessions. Advantageously, the Presentation Manager TM API operating system supplies several window classes that have a standard appearance. In addition, developers can register their own window classes. In either case, Presentation Manager TM resources are provided for generating display windows automatically so that the application developer is freed from the task of writing window display code. These resources also include a subset library of routines, collectively referred to as the Information Presentation Facility (IPF) for generating application-related help information windows.

As is well known, a Presentation Manager TM application can create several windows of any class, each with its own data, and arrange the windows on the screen like papers on a desk top. Several Presentation Manager TM applications can be run concurrently with the windows of each application sharing the screen with the windows of other applications. These windows can overlap, with overlying windows obscuring parts of underlying, overlapped windows. Users direct input to visible active windows from a mouse or keyboard input device. Each window thus includes visual controls and data entry areas to facilitate the input function.

User input is directed to applications associated with input windows by the OS/2 TM operating system in the form of messages, which are a fundamental part of the OS/2 TM operating system. Presentation Manager TM applications use messages to communicate with each other and with the operating system. These messages are passed through a system message queue. Each application also has an input message queue, and the application message queue is identified by a window "handle". Sources of events that cause a message to be sent to an application are several. As indicated, the OS/2 TM operating system directs messages to an application in response to a mouse or keyboard input to the application window. In other cases, the OS/2 TM operating system itself, in managing the application windows on the screen, sends messages to the windows. Events can also occur in an application to which another part of the same application should respond. For example, an application can send itself a message to repaint the contents of a window which has been changed as a result of user input. Finally, applications communicate with each other via messages.

In order to support message-based processing, each Presentation Manager TM application is structured to utilize a main procedure and a window procedure. The main procedure initializes operating system resources, creates an application message queue, registers and creates the window(s) of the application, creates a message-processing loop to get messages from the input queue and send them to the window procedure to be processed, and upon program termination, terminates operating system resources used by the application. The window procedure processes every message in which the application is interested and takes appropriate action. If necessary, the window procedure also calls system-provided default window procedures to deal with messages in the which the application is not interested. These messages are returned to the system message queue, or may be directed to another application's input queue or window procedure.

The foregoing features of the OS/2 TM operating system and Presentation Manager TM API are exploited to significant advantage in the preferred embodiment of the present invention. In accordance therewith, a tutorial system has been developed for providing instruction in the use of a software product known as AD/Cycle. The Integrated Reasoning Shell TM, or TIRs. The TIRS TM product is an expert system program which creates knowledge applications for a variety of uses such as banking, finance, etc. The tutorial system developed for TIRS gives novice users hands-on experience in developing knowledge applications using TIRS. The tutorial conforms with IBM's Systems Application Architecture TM Common User Access or CUA standard for the presentation of display information and user input. The tutorial was written as a Presentation Manager TM application. It utilizes the above-referenced multi-tasking, graphical and windowing environment of OS/2 in presenting lesson information to users. Tutorial lessons are displayed in the tutorial's own task window tiled with the TIRS product window(s). Users can view step-by-step instructions in the tutorial lessons and at the same time interact with TIRS to try out these instructions.

The tutorial uses the OS/2 TM Information Presentation Facility for the authoring and presentation of lesson information, although no limitation in scope of the invention is intended thereby. Other commercial information presentation facility could also be used. Alternatively, customized information presentation formats providing audio and video instruction could be utilized as would all be apparent to persons skilled in the art in light of the teachings herein. As indicated, IPF provides a programming tool for the implementation of a help interface. Using IPF, an interface window can be readily developed that provides not only general help for application windows, but also contextual help for fields within windows. The Information Presentation Facility allows software developers to author their own help panels using an IPF tag language. The IPF tag language includes text to be displayed in a help panel together with commands that define relationships between different portions of the help information text. Help panels can be written by the developer in the IPF tag language source code and compiled by an IPF compiler. IPF provides standard window graphics objects for displaying the help text and allowing users to control the presentation of information.

Each help panel represents a separate text unit having its own panel identifier. Advantageously, the IPF tag language allows developers to insert hypertext or hypergraphic links between help panels, or between a help panel and a smaller footnote panel. Moreover, hypertext objects can be defined which cause messages to be generated when selected. These features are all utilized to advantage by the tutorial system described herein. Each of the lesson display files 34 shown in FIG. 1 represent an IPF help panel created using the IPF tag language. The IPF lesson display files 34 contain lesson information. The tutorial system inputs the lesson display files and adapts and controls the Information Presentation Facility to present lesson information according to the tutorial's specifications.

The tutorial is integrated with the product insofar as the two applications communicate with each other through a message passing scheme. As indicated, OS/2 conveys information between concurrently running applications in the form of messages. Relatedly, the tutorial passes messages directly to the product's main window. In an alternative embodiment, messages are passed through dynamic data exchange (DDE), a standard OS/2 TM interprocess communications protocol. Through DDE communications, the tutorial sends messages requesting the product to perform certain actions.

The tutorial monitors what users are doing in the product by intercepting messages to the product in the OS/2 TM Presentation Manager TM message queue before they get to the product. It then compares the user action with the expected action to see whether the user's action is correct. A show-me function is also provided wherein the student may request the tutorial to perform one or more input actions to drive the product. These action commands are passed to the product in the form of messages. The lesson control file is utilized by the tutorial for the monitoring and show-me functions. This control file contains commands that correspond to actions specified by the tutorial's lessons, which users are to perform. For the show-me function, the tutorial interprets the commands and reformats them as OS/2 TM messages to drive the product to perform the lessons' actions. For the monitoring function, the tutorial compares user input with the commands in the lesson control file, to determine whether user input is correct. The tutorial program is preferably written in the "C" programming language, although persons skilled in the art will appreciate that tutorial routines for controlling Presentation Manager ™ resources in the manner described could be readily written in any suitable programming language based on the teachings set forth herein. Generally speaking, the main tutorial procedure module contains initialization and termination routines. It performs the following functions:

Initialize tutorial's object windows.
Create an IPF instance.
Get IPF's window handles.
Control the size and position of IPF windows.
Bring up the product application.
Dynamically adjust a lesson control pointer based on the currently displayed lesson, obtained from the title of the lesson in the lesson window.
Display messages to users.
Present conceptual help for the tutorial e.g., through a second instance of IPF.
Close tutorial windows and perform necessary housekeeping.

The tutorial's window procedure module provides processing for the tutorial's functions. This includes:

Processing user interactions with the tutorial through the
tutorial's action bar
tutorial's inform hypertext fields
Setting up communications with the product.
Performing the show-me function, by sending commands to the product.
Monitoring user actions.

Lesson Presentation

The OS/2 ™ Information Presentation Facility (IPF) provides windowing and hypertext capabilities which give developers a number of options for structuring and presenting information not available through online tools without these capabilities. Rather than presenting information linearly and sequentially in full screen formats, much like books, online information can be structured in networks and presented in windows. Users can have more control over whatever information they see. Developers have more options in how to best present information. Windows and hypertext enable information to be presented more effectively by minimizing the basic information that is displayed, and allowing users to select additional information through hypertext links. Moreover, users can view related information simultaneously in separate windows or view sequential information in pop-up windows, maintaining a context for what they see.

FIGS. 2-6 illustrate the presentation of lesson information in various forms. Each of the figures illustrate a display (desk top) window 50 which occupies the entire screen of the display device 20. The tutorial is displayed in a tutorial or main help window 52 while the product is displayed in a product window 54. These windows are tiled and sized so that the tutorial window 52 occupies approximately 35 percent of the width of the display window 50 while the product window 54 occupies approximately 65 percent of the display width. Each window conforms to the IBM CUA standard. Thus, the tutorial window 52 includes a title bar 56, a system menu icon 58, a window sizing button 60 and an action bar 62 containing action menu items. The product window 54 also includes a title bar 64, a system menu icon 66, window sizing buttons 68 and 70, and an action bar 72 containing action menu items. The product window 54 further includes a client area 74 where product display output is generated. The tutorial or main help window 52 is somewhat different. It includes a help text window 76 which is a standard window generated by the OS/2 ™ Information Presentation Facility, along with the main help window 52, when a request for help is initiated. The help text window 76 includes a title bar 78, a system menu icon 80, window sizing buttons 82 and 84, and a vertical scroll bar 86.

As is conventional, the window title bar identifies the window shown in the display. The system menu icon can be activated by mouse input using a conventional point-and-click operation to display a system pull-down-menu containing selectable system-related functions. The window sizing buttons enable the user to control window size via mouse input. As is also conventional, the menu items contained in the window action bar can be selected via a mouse or keyboard input to generate an action pull-down menu (not shown) for each of the action menu items.

Figure 3:
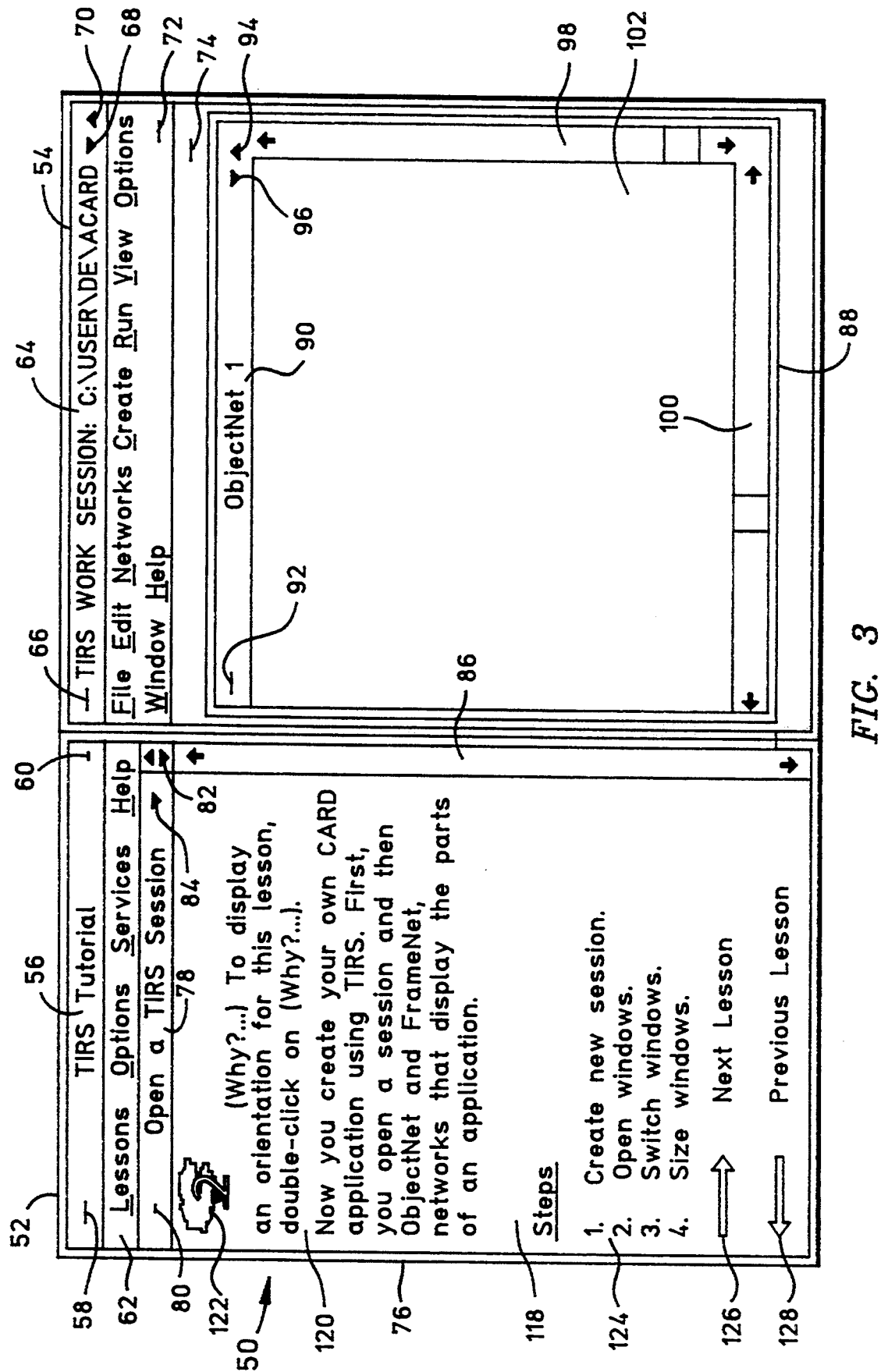
FIG. 3 is another diagrammatic illustration of a screen display containing lesson information generated by the tutorial system of FIG. 1.

The foregoing window structures appear when the operation of the tutorial system and the product application are initiated. Additional window structures will appear during tutorial and product operations. In the product itself, as shown in FIG. 3, a product sub-window 88 may appear in the client area 74 of the main product window 54. The product sub-window includes a title bar 90, a system menu icon 92, window sizing buttons 94 and 96, a vertical scroll bar 98, a horizontal scroll bar 100 and a client area 102.

Figure 2:
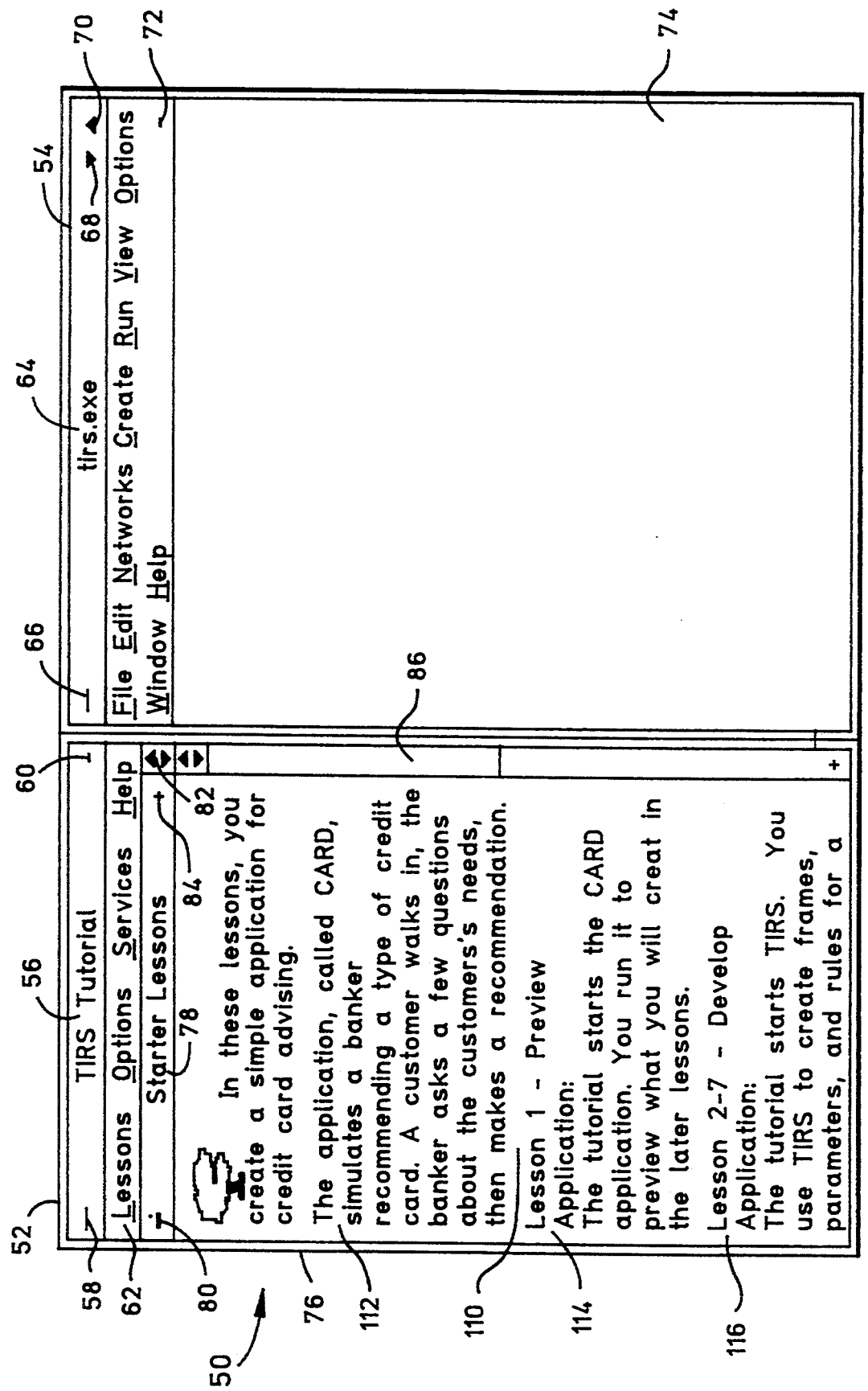
FIG. 2 is a diagrammatic illustration of a screen display containing lesson information generated by the tutorial system of FIG. 1.

In the tutorial system, the basic unit of information is a lesson. In a version of the tutorial system shown in FIGS. 2-5, there are two sets of lessons, starter and advanced. In the starter lessons, users are taught basic procedures for product functions. In the advanced lesson, there is less emphasis on procedures and more on strategies for applications, on concepts and on tying together different parts of the product. To present lesson selections to a user, the tutorial system first presents a panel entitled "Welcome" (not shown), which lists selection choices for starter and advanced lessons. In FIG. 2 an information panel 110 entitled "Starter Lessons" is displayed in the tutorial text window 76. The starter lessons panel 110 presents summary information 112 concerning the tutorial lessons. It also presents additional lesson-specific information in paragraphs 114 and 116, for starter and advanced lessons, respectively. In FIG. 2, for example, the user is presented with an overview of a first lesson 114 to preview a product application and an overview of more advanced lessons 116 to develop a product application. In some cases, as also shown in FIG. 2, the lesson panel information may not entirely fit within the tutorial text window 76. The vertical scroll bar 86 allows the user to scroll through the entire panel using a mouse, or the keyboard as is conventional.

The tutorial system adopts a model lesson format that clearly separates different types of information, but at the same time shows how they fit together at a single glance. Each lesson contains an overview and multiple steps for performing the lesson tasks. The steps are like subtasks and are further broken down into individual actions. Associated with each action are instructions and notes that describe the meaning or result of the action. There is a hierarchical relationship between lessons and steps (i.e., lessons contain steps) and a sequential relationship between steps (i.e., one step follows another). In addition, associated with each lesson is a set of concepts. These concepts have a parallel relationship to information in the lesson. The result is a combination of three types of tutorial windows:

1. Lesson Windows;
2. Step Pop-Up Windows; and
3. Concept Windows.

In FIG. 3, the tutorial text window 76 provides a lesson window. The lesson window contains a lesson panel 118 having a short overview paragraph 120 that describes and subject matter of the lesson. At the beginning of the overview is a "(Why?...)" hypertext field 122 that leads to an explanation of the significance of the lesson. Also embedded in the introductory paragraph 120 are hypertext words that refer to concepts covered by the lesson. The lesson panel 118 includes a numbered list of steps 124 for accomplishing lessons tasks. Each step defines a subtask (e.g., create a new session). Detailed instructions are not presented at the lesson level. However, the first word of each step 124 is a hypertext link to a step pop-up window. The lesson panel further contains "Next Lesson" and "Previous Lesson" pointers 126 and 128. Pointers 126 and 128 are hypergraphic links to lesson panels that immediately precede and succeed, respectively, the lesson panel 118 displayed in the text window 76. Students can also select lessons from the "Lessons" action in the action bar 62. Activating the "Lessons" action produces a pull-down menu listing various selection options, as discussed in more detail below.

Figure 4:
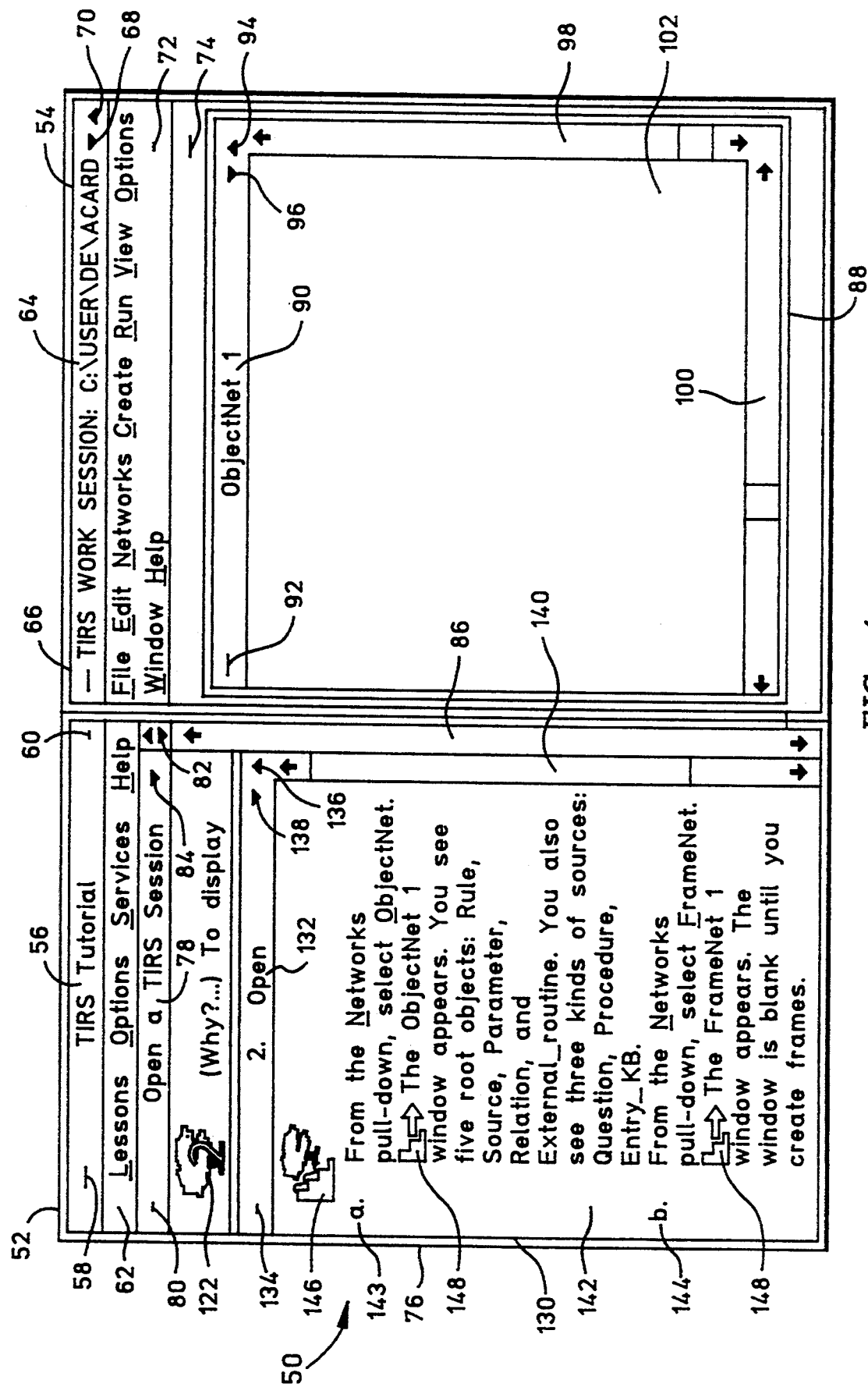
FIG. 4 is another diagrammatic illustration of a screen display containing lesson information generated by the tutorial system of FIG. 1.

Referring now to FIG. 4, a step pop-up window 130 is displayed in the tutorial text window 76. The step pop-up window 130 is an IPF footnote window that includes its own title bar 132, a system menu icon 134, window sizing buttons 136 and 138, and a vertical scroll bar 140. The step pop-up window 130 contains detailed information for each step 124 identified in the lesson panel. Displaying this detailed information in a pop-up window helps the user to maintain context. When users complete a step, they return to the lesson window and again see the list of steps and where they are in the list.

The step window 130 is used to display a step panel 142 containing a list of actions, e.g., 143 and 144, that the user needs to perform. A step graphic symbol 146 marks a description of the step being performed. Step-/arrow graphic symbols 148 marks notes about performing actions and product syntax and conventions. The actions, e.g., 143 and 144, are each assigned a letter and kept on separate lines to make clear what the user must actually do. The step panel 142 further includes "Next Step" and "Previous Step" pointers (not shown). These pointers are hypergraphic links to step panels that immediately precede and succeed, respectively, the step panel displayed in the pop-up window 130. The first and last step panels 142 associated with a lesson also contain "Go Back" and "Go On" pointers (not shown), respectively. These pointers are hypergraphic links that allow students to return to the lesson window in which the step is contained. This enables users to obtain a review following lesson completion, before proceeding to the next lesson.

Figure 5:
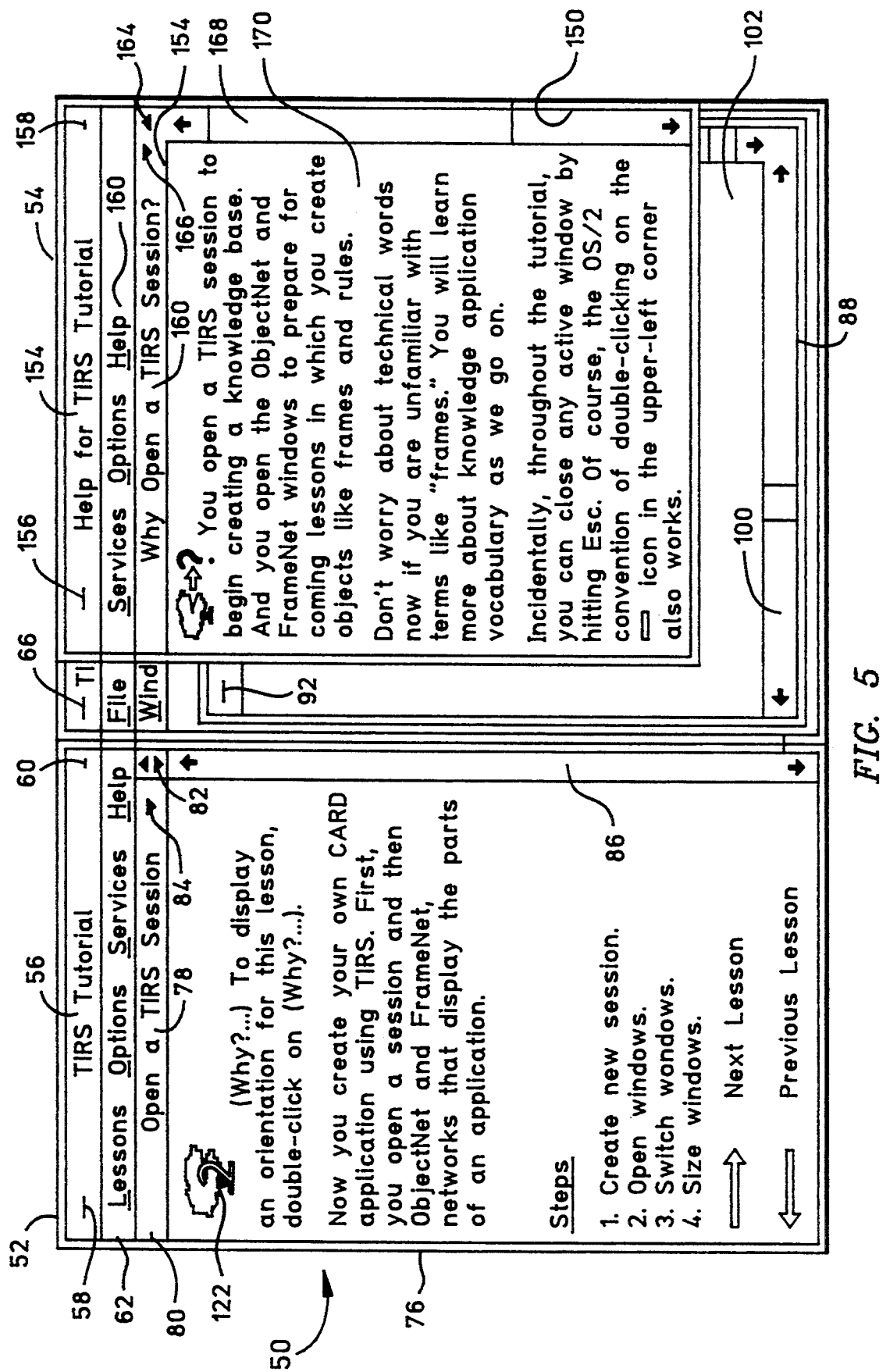
FIG. 5 is another diagrammatic illustration of a screen display containing lesson information generated by the tutorial system of FIG. 1.

Referring now to FIG. 5, a concept window 150 displays orientation and conceptual information requested by the user. The "Why?..." hypertext field in the lesson window overview 122 and special hypertext terminology in the overview 122, and in the step panels, are highlighted to show that they link to the concept window 150. Concept information can also be obtained through the "Help" action in the action menu 62. A pull-down menu is activated by this selection, and allows the student to select conceptual information from an alphabetically ordered list of concepts (not shown). When activated, the concept window appears over the product window 54, allowing users to maintain the context of the lesson from which they selected a concept. Special terminology is also highlighted (as hypertext) in the concept window, so users can explore related concepts. Selecting a hypertext field replaces the current concept panel information that is displayed. The concept window also displays help for the tutorial.

As discussed in more detail below, the concept window 150 is preferably implemented as a second instance of an Information Presentation Facility help window. Thus, it includes a main help window 152 and a help text window 154. The main window 152 includes a title bar 154, a system menu icon 156, a window sizing button 158 and an action bar 160. The text window 154 includes its own title bar 160, a system menu icon 162, window sizing buttons 164 and 166, a vertical scroll bar 168 and a client area 170.

Navigating through the tutorial information is straight forward and intuitive. Essentially, users double click on a selected hypertext or hypergraphic element to go to the next step or next lesson. Preferably, the information hierarchy is only two levels deep: lesson and step, so users can easily see what lesson and what step they are on. However, users may deviate from the sequential path by selecting hypertext fields or by selecting a step or a lesson other than the next sequential one.

In order to present tutorial information in the format described above, it is necessary to control the behavior of IPF to the tutorial's specifications. IPF provides a standard interface for presenting help information. The tutorial system uses this resource as well as Presentation Manager ™ programming techniques to control IPF for presenting lessons. Initially, the tutorial module 30 creates an object or invisible application window. It creates a help instance using IPF's API call "WinCreateHelpInstance". The reason for making the tutorial window invisible is that all tutorial information is displayed in IPF windows. The tutorial control interface controls the display and navigation of that information. In order to control the behavior of IPF windows, the tutorial's main procedure gets the handle to the main IPF window. Currently, IPF's API does not provide a way to do so. Although the "WinCreateHelpInstance" function returns a window handle, this is the handle of the IPF object window, not the handle of the main IPF window. Since the main IPF window is the next sibling of the invisible tutorial window, the Presentation Manager ™ call "WinQueryWindow" can be used to get the window handle of the IPF window.

Three different types of IPF windows are used for presenting tutorial information:

1. Main IPF (and Help Text) Window for Lesson Panels

Once the main IPF window handle is obtained, the tutorial can move and size the main help window, as well as its related help text window. As shown in FIGS. 2-5, the tutorial tiles the main IPF window with the product window. The tutorial positions the IPF window to the left side of the screen and sizes it such that it is 35% of the width and the full length of the screen, as indicated previously. This is done with the Presentation Manager ™ "WinSetWindowPos" call, and provides the default position of the tutorial window as it appears to users. This proportion is used for both VGA and EGA monitors.

2. IPF Footnote Window for Detailed Step Information

As indicated, the OS/2 TM Information Presentation Facility allows developers to create hyperlinks from help panels to footnote panels. When a link to a footnote panel is activated, IPF procedures generate an IPF footnote window on the display which overlays the IPF main help and help text windows. The IPF footnote window also needs to be sized specifically for the tutorial. The default size and position of the footnote window is the full width and 90% of the height of the main IPF window. Users can modify the size of this window. The tutorial will remember the user modified size and present subsequent footnote windows to the user-specified size. To control the size of the footnote window, the tutorial's main procedure sets an input hook to trap all "WM_CREATE" (create window) messages to the tutorial process and looks for the creation of the footnote window, which is always a child of the IPF text window. When a create footnote window message is detected, the tutorial saves the window handle of that footnote window. Then it looks for the "WM_ADJUSTWINDOWPOS" (adjust window position) message which IPF sends to the footnote window. The tutorial intercepts that message, and modifies the size and position structure that is passed in the message to the desired size for the footnote window.

3. Secondary IPF Window for Presenting Conceptual Help Information

Conceptual and help information are displayed in a secondary IPF window. Users request conceptual information from imbedded hypertext fields of the lesson panels. Conceptual and help information can also be obtained from a Help pull-down menu activated from the tutorial action bar 62. In either case, a second instance of IPF is associated with the tutorial program through the standard IPF API. The tutorial accepts the default size and position of the secondary IPF window for displaying conceptual information. This secondary window is displayed to the right of the main tutorial IPF window (i.e., the product window 54), as shown in FIG. 5.

Users can terminate the tutorial through the exit choice from the "Lessons" pull-down menu activated from the tutorial action bar 62. The tutorial needs to know when a user has closed the IPF window so that the tutorial can close the invisible tutorial window as well. Currently, IPF does not have a "close" message to indicate that the IPF window is closed, so the tutorial utilizes its own method of detecting this situation. A "WinRegisterWindowDestroy" Presentation Manager TM call is used after the main IPF window handle is obtained. This instructs the Presentation Manager TM API to inform all top level windows (including the invisible tutorial window) when the main IPF window closes. When the tutorial application receives a "WM_OTHERWINDOWDESTROYED" message from the Presentation Manager TM API, the tutorial program destroys the invisible tutorial window and ends the application.

IPF provides a standard application action bar as well as a method for customizing that action bar. The standard IPF action bar includes the "Services", "Options" and "Help" actions. To create the tutorial action bar 62, an additional "Lessons" action was added. Moreover, the tutorial retained the "Services" pull-down menu of IPF but made changes to all the other pull-down menus. The tutorial system processes these menu choices when users select them.

The Standard Services pull-down menu utilized by the tutorial system includes the following items:
SEARCH—performs word searches of selected help information.
PRINT—prints selected help information.
COPY—copies currently displayed help information to a system clipboard.
COPY TO FILE—copies currently displayed help information to a text file.
APPEND TO FILE—appends currently displayed help information to a text file.

The Lessons pull-down menu added by the tutorial system includes the following items:
STARTER—displays starter lesson.
ADVANCED—displays advanced lessons.
VIEW LESSONS—displays a list of viewed lessons.
PREVIOUS LESSON—goes to the previous viewed lesson.
EXIT—exits the tutorial program.

The Options pull-down menu, as modified by the tutorial system, includes the following items:
MONITOR OFF—turns monitoring off.
SHOW ME—executes show-me for a lesson, step or action.
TILE—tiles the tutorial and product windows.
SAVE—saves the current tutorial session.
RESTORE—restarts a saved tutorial session.

The Help pull-down menu, as modified by the tutorial system, includes the following items:
HELP FOR HELP—provides help for using help.
EXTENDED HELP—provides help for using tutorial.
KEYS HELP—provides help for navigating through tutorial.
CONCEPT HELP—displays conceptual information for a lesson, step or action.

As indicated, the tutorial uses IPF's hypertext links to allow users to navigate through basic lesson information or browse additional information. These hypertext fields are selection fields, which users can double click on to select. This is the only way IPF allows users to interact with it as IPF does not have the capability of displaying output or input fields. The tutorial uses hypertext links in several ways. Panel reference links are used to link lesson panels. As described above, users can navigate from one lesson to another lesson, using the previous or next lesson buttons on the lesson panel. These buttons are linked to other lesson panels using IPF's "hdref" link. IPF "inform" links are used to display detailed step information. As previously described, each main lesson panel includes a list of steps for performing the lesson's task. Users may double click on these steps to get the step footnote window. Inform links are used to give control back to the tutorial to perform these tutorial functions. When IPF gets an inform link, it sends an "HM_INFORM" message to the tutorial along with a message number that is associated with the inform link. Following are inform message numbers used by the tutorial system and their meanings:

1. Next Step (7777). To go from one step pop-up window to another, users can double click on the next step button. A '7777' inform message is sent to the tutorial to request that an Esc message and a Tab message be sent to the tutorial IPF instance.

The Esc key closes the current footnote window, the tab key moves the cursor to the next hypertext field in the lesson panel. This is the next step field.

2. Previous Step (6666). The previous step button allows users to go to the previous step in the lesson sequence. The message number is '6666' and the sequence of actions is Esc, then Shift+Tab. The processing is similar to the next step button above.
3. Go Back (3333). This button is found on the step window for the first step in each lesson. It merely closes the footnote window and returns to the lesson window with the Esc action. The inform number is '3333'.
4. Go On (111). This button is found on the step window for the last step in each lesson. It closes the footnote window with the Esc action and sends a tab key to position the cursor at the next lesson button in the lesson panel. The inform number is '111'.
5. Show-Me (2222). On each step panel, there is a step graphic, which when selected will execute the show-me function for the current step. This graphic is linked to a '2222' inform message. When the tutorial receives this message, it executes the show-me function for this step.
6. Go to 2nd IPF Window (600–800). All inform messages between 600–800 signify to the tutorial program that it should display a panel with that message number in the secondary IPF window. These panels contain the conceptual information.
7. Close 2nd IPF Window (1111). On the bottom of the panels displayed in the secondary IPF windows, there is a 'return to lesson' button. This button is associated with a '1111' inform message and causes the tutorial to close the secondary IPF window.

Figure 6:
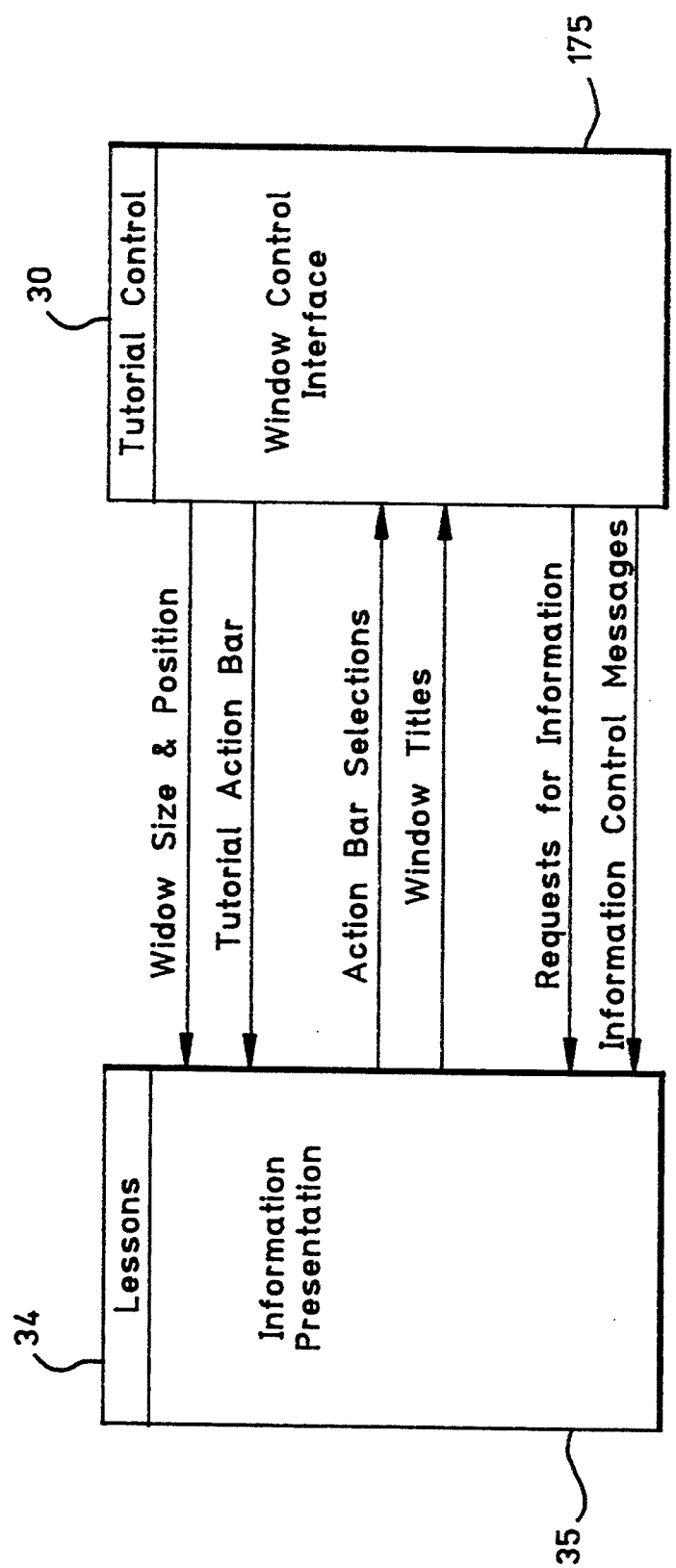
FIG. 6 is a block diagram showing the control of lesson information presentation in the tutorial system of FIG. 1.

The actions taken by the tutorial to control the presentation of information through the Information Presentation Facility are illustrated graphically in FIG. 6. The control actions may be thought of as being performed collectively by a Window Control Interface 175. As indicated, the Window Control Interface provides control input to the Information Presentation Facility to define window size and position, and the contents of the tutorial action bar. The Window Control Interface receives action bar selection messages from the Information Presentation Facility. It also monitors the window titles in order to start the product. This is possible because the title of each lesson panel displayed in the tutorial text window 76 is contained in a message instructing the Information Presentation Facility to display that panel. The tutorial system uses a Presentation Manager TM procedure called subclassing to intercept this message to the IPF window. The message is compared to a series of lesson titles listed in a string table maintained by the tutorial system. When the panel title matches one in the string table, the tutorial system starts the application. The Window Control Interface 175 also processes the inform messages resulting from the activation of inform hyperlinks. It returns appropriate control messages to the active IPF window.

Monitoring User Actions

Although it is believed that users can learn a great deal about a product from exploring it on their own, unassisted exploration can lead to user frustration if users get lost or make unrecoverable mistakes. In user tests of a tutorial constructed in accordance with the present invention, it was observed that some users deviated from the instructions of the tutorial. Some were able to retrace their steps back to the path of the tutorial while others got lost and could not successfully complete the lessons without intervention. Thus, it is desirable to provide a way for the tutorial to check user actions and to prevent them from straying.

To provide this fail-safe environment, the tutorial system implements a monitoring function. The monitor is like a strict tutor that expects users to perform every action in the order that the lesson specifies and prevents users from deviating from this path. On the other hand, the monitor allows users to perform tasks that are noncritical to the product, such as scrolling or looking at pull-down menus in both the tutorial and the product. The monitor also allows users to perform tasks that are unrelated to either the tutorial or the product of interest. Although monitoring is helpful to some users because it prevents them from getting lost or getting into trouble, others may be annoyed by the monitor because it restricts them from exploring the product on their own. For this reason, the monitoring function is optional and the tutorial allows users to turn off this capability, via the options pull-down menu, when they do not want it. The monitoring function is invoked by default when the tutorial is commenced.

A tutorial lesson control file is used by the tutorial system to monitor user actions, and to provide the show-me function, described in more detail below. The lesson control file contains commands that correspond to actions specified in the tutorial's lessons, which users are to perform. For the show-me function, the tutorial interprets these commands and reformats them as OS/2 TM messages to the product, thus driving the product to perform the lessons' actions. For the monitoring function, the tutorial compares user input with the commands in the file, to determine whether the input is correct.

The statements in the lesson control file follow the structure of a lesson. Thus, the basic lesson control structure is one where each lesson consists of steps, each step consists of action-groups and each action group consists of individual actions.

Schematically, the structure is as follows:

```
Lesson
  step
    action
    action
    ...
    ...
  step
    ...
    ...
Lesson
  ...
  ...
```

The lesson control file is written in a tag language similar to the IPF tag language. The statements begin with a colon(:) and may be followed by one or more parameters that describe the statement. Comments are denoted by "*". The following statements define the lesson and step structures of the lesson control file and may have simple keyword parameters attached to them:

LESSON NUM=n RES=n TITLE='text'
ELESSON
STEP NUM=n.n

ESTEP

Figure 8:
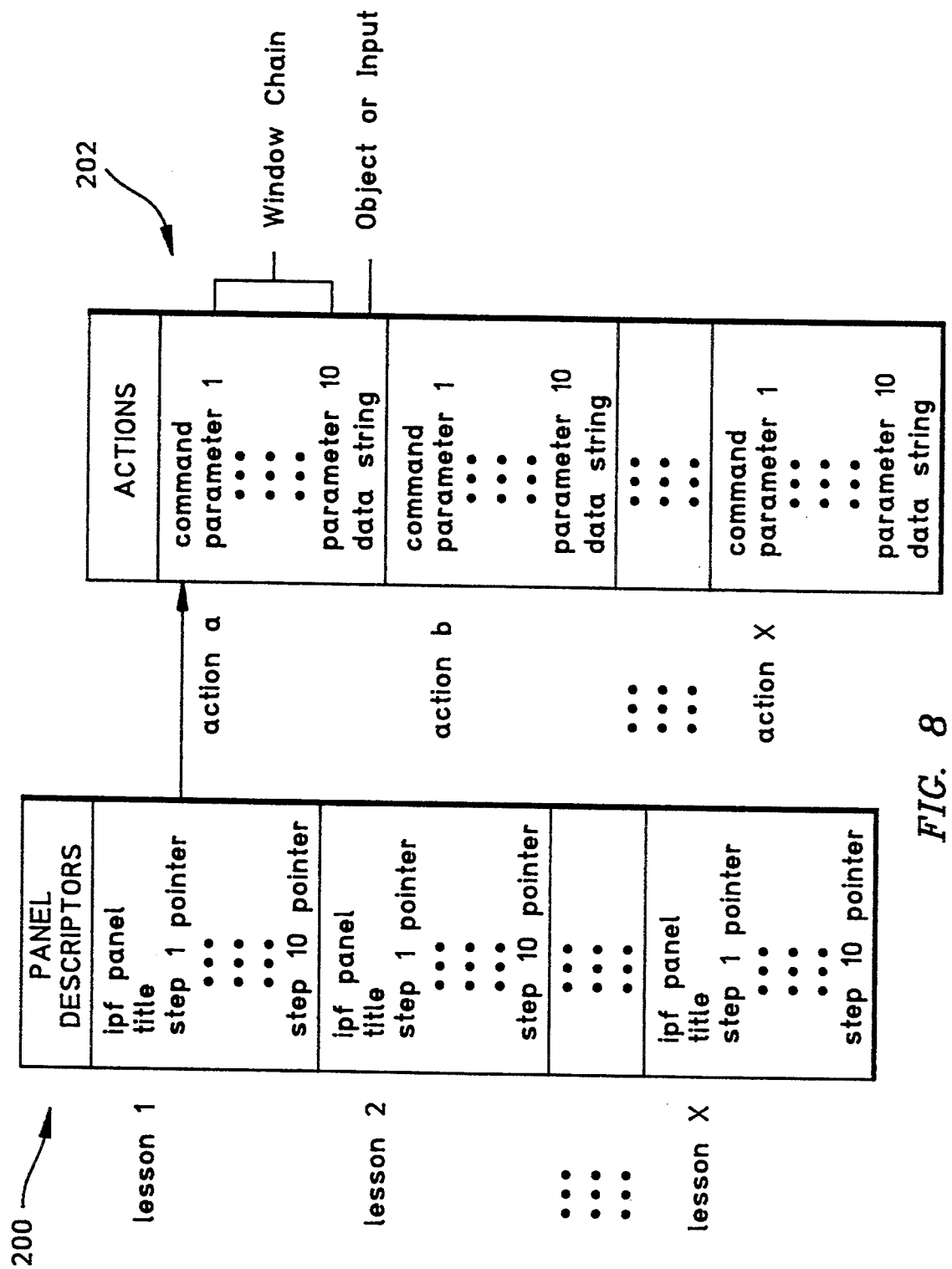
FIG. 8 is a block diagram showing a lesson control table data structure utilized by the tutorial system of FIG. 1.

There are other statements consisting of commands that correspond to actions in the product. Each command has up to 10 parameters. These commands must start on a new line. The form of the statements is as follows:

NUM=l.s.a COMMAND=xxxxx P1=n P2=n P3=n P4=n P5=n . . . Px=n D1="text" TAG='-'text", where l=lesson number, s=step number, a=action letter, COMMAND specifies the input action type, P1 . . . Px specify parameters representing window (or object) identifiers for locating windows (or objects) within the product to which commands are directed, each parameters specifying window hierarchy of windows within the product, D1 specifies data and TAG is used for documenting the action. An additional "0" tag parameter (not shown) may also be specified. The "0" tag parameter is utilized to identify input actions that are optional in nature. For example, some product input requests are contextual in nature, meaning that the input request is presented under some circumstances but not others. The tutorial monitor must be capable of monitoring current responses when necessary while anticipating that no input may be required in other cases. When the tutorial encounters an action having "0" parameters, it tests the user's against both the "0" tag action and the next action. Thus, the tutorial correctly monitors the optional responses, if one is made, and the next product action, if the option response is not made. FIG. 7 illustrates the tag language format used in the lesson control file for various commands corresponding to product input actions. These commands are identified as follows:

MENU_SELECT Select menu items
USER_INPUT Input to dialog boxes
DLG_BUTTON Click on dialog buttons
NET_CLICK1 Single click on network objects
NET_CLICK2 Double click on network objects
LIST_CLICK1 Single click on list items
LIST_CLICK2 Double click on list items In order to utilize the lesson control file, the tutorial system utilizes a tutorial parser module that parses the tutorial lesson control file into internal data structures defined by the tutorial. This internal data structure is illustrated in FIG. 8. It includes a panel descriptor table 200 and an action table 202. The panel descriptor table 200 is an array of structures that contain all lesson information read in from the lesson control file. One instance of this structure describes the details of each lesson's steps. It includes the IPF panel ID number and the title displayed in the panel as well as a list of pointers to the action structures that make up the actions of the steps. The action table 202 is a structure used to describe an action's commands and parameters, such as those shown in FIG. 7. The information contained in the panel descriptor and action tables comes directly from the lesson control file statements. The tutorial parser opens the lesson control file, parses each line and stores the appropriate portions thereof in the panel descriptor and action tables. The parser thus functions as a compiler that compiles the tutorial lesson control file into an object structure which is utilized by the tutorial monitor. If desired, the tutorial parser could be maintained separately from the tutorial system for compiling lesson control files as they are written. The compiled lesson control files would be stored for subsequent use by the tutorial system.

The tutorial parser utilizes two data structures for ensuring that the lesson control table includes valid product command information. These data structures include an object identifier look-up table for valid product interface object identifiers. This list includes windows, menus, buttons, selection fields and function keys used by the product. An additional command look-up table contains valid command types used by the tutorial.

Figure 9:
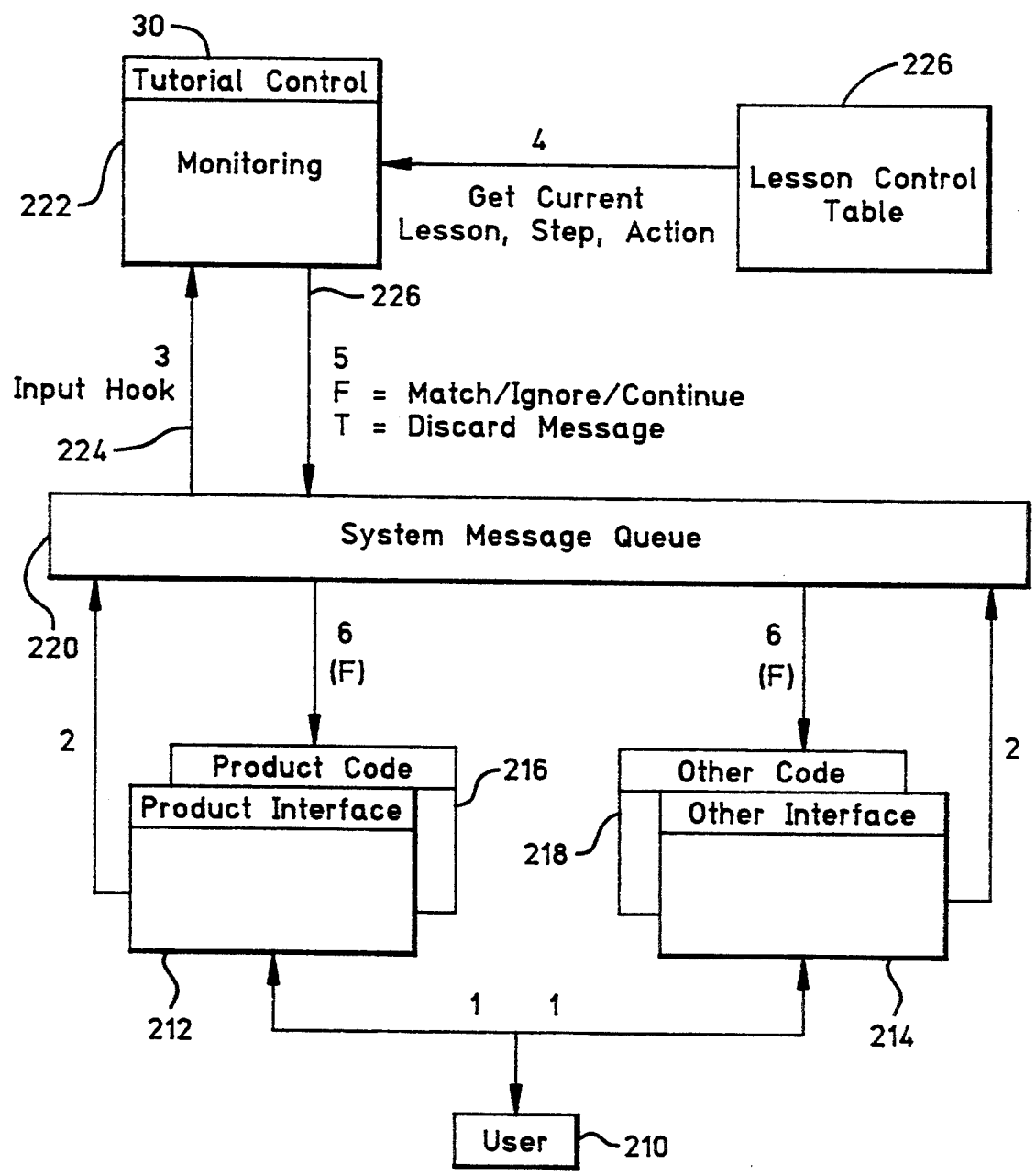
FIG. 9 is a block diagram showing message flow during the user input monitoring function performed by the tutorial system of FIG. 1.

FIG. 9 illustrates message flow during tutorial monitoring. As shown thereon, input messages are generated when input is received from a user 210. These messages may be intended for the product of interest, or to other applications currently running in the operating system, or to the operating system itself. In the Presentation Manager ™ API, the user creates inputs through a display window which serves as an interface. In FIG. 9, an interface 212 for the product of interest and an interface 214 for other applications running in the operating system are shown. Each includes underlying code modules 216 and 218, respectively. When the user enters input through the appropriate interface window 212 or 214, the OS/2 ™ operating system generates an input message and places that message on the system message queue 220. The tutorial control module 30 provides the monitoring function through a tutorial monitor 222. An input hook 224 is used to trap messages sent to the system message queue 220 including the input messages generated by the user 210. The tutorial monitor 222 compares these messages with the appropriate action contained in the panel descriptor and action structures, which are illustrated collectively in FIG. 9 as a lesson control table 226. To facilitate the comparison of commands, the tutorial monitor 222 utilizes a lesson control pointer which increments to a subsequent entry in the lesson control table each time a correct action is taken. The tutorial monitor also compares the input messages to the object identifier and command tables previously described. Depending on a match or a mismatch condition, a corresponding "True" or "False" message 226 is sent by the tutorial monitor to the system message queue 220.

Figure 10A:
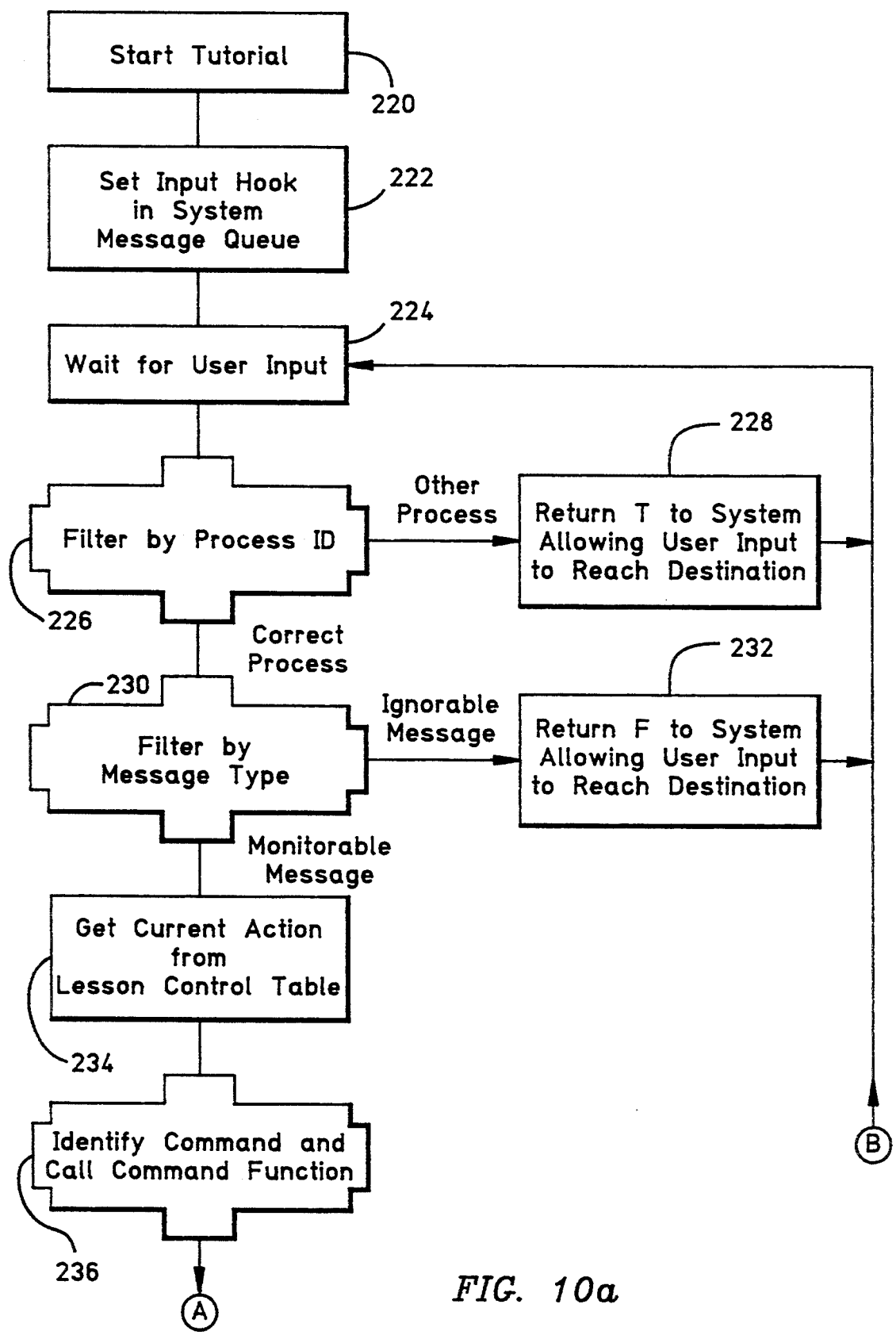
FIG. 10a is a first portion of a diagram showing logic flow during the user input monitoring function performed by the tutorial system of FIG. 1.
Figure 10B:
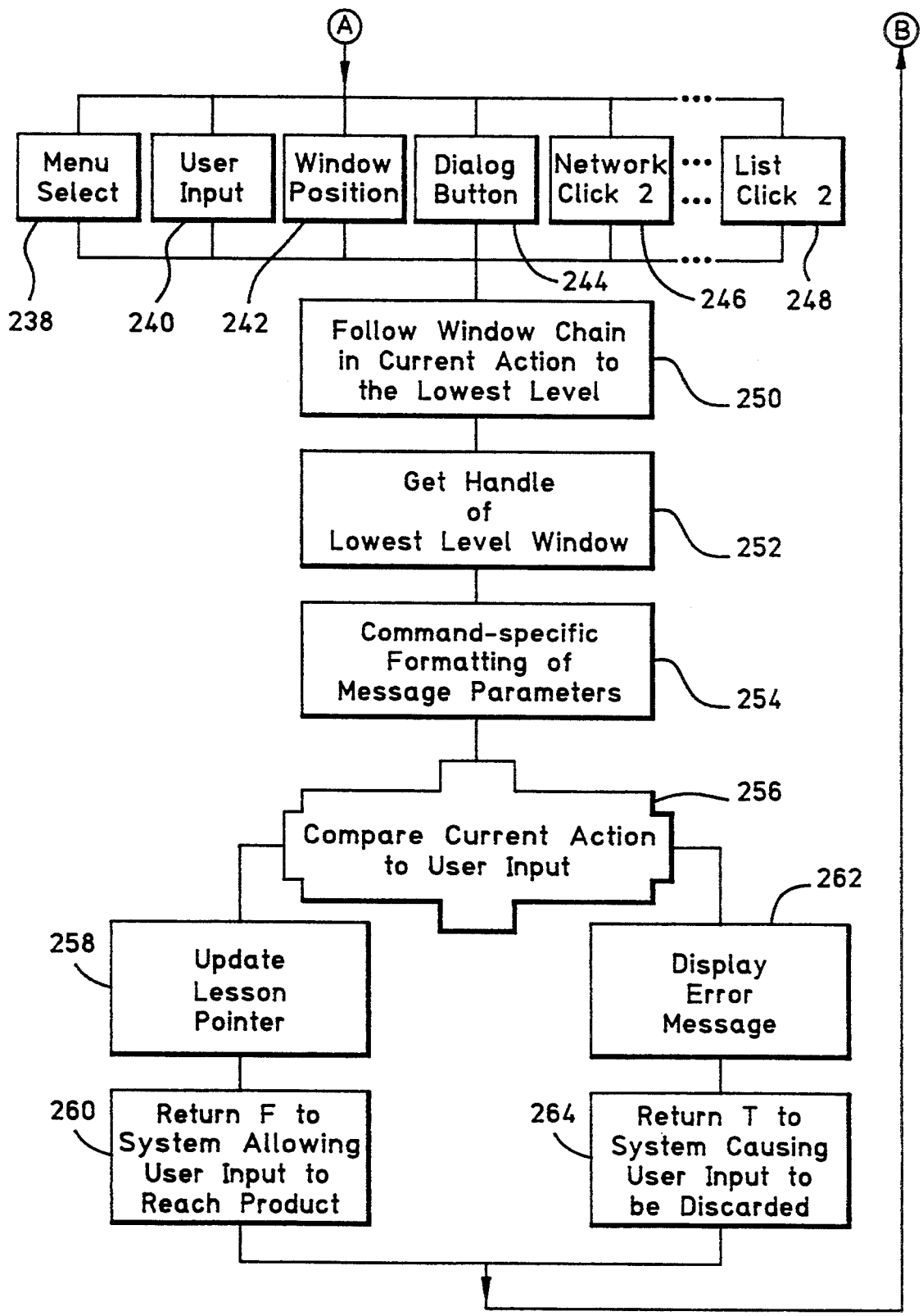
FIG. 10b is a second portion of a diagram showing logic flow during the user input monitoring function performed by the tutorial system of FIG. 1.

Logical flow during the tutorial monitoring process is illustrated in FIGS. 10a and 10b. Process step 220 indicates the start of the tutorial program. The tutorial uses the Presentation Manager "WinSetHook" call to set an input hook "HK_INPUT" to intercept all input messages of all Presentation Manager ™ processes. This action is illustrated as step 222 in FIG. 10a. In step 224, the tutorial waits for user input messages and, upon receiving one, proceeds to the next step 226. There, the tutorial monitor 222 filters the received input message by object identifier. This filtering is performed by a tutorial procedure specified to the input hook call previously described. The procedure tests each input message based on its OS/2 ™ assigned process ID to determine whether the message is meant for the product of interest or some other application or the operating system itself. If the message does not relate to the product, the tutorial monitor 222 returns a "False" message to the system message queue in step 228 and the user input message is allowed to reach its intended destination. If the comparison in step 226 indicates that the message is intended for the product of interest, the message is filtered by message type in step 230. In this step, the tutorial flags those messages to the product that are action messages. For those which are not, the tutorial monitor 222 returns a "False" message to the system message queue in step 232 and the user input message is allowed to reach its intended destination. In step 234, the tutorial monitor obtains the current action from the lesson control table 226, based on the position of the control pointer. In step 236, the tutorial monitor identifies the current command action from the command selections 238 through 248 shown in FIG. 10b. These commands correspond to the tutorial commands shown in FIG. 7. Based on the command type, an appropriate OS/2 TM message structure is determined. The tutorial monitor then constructs an OS/2 TM message having appropriate OS/2 TM message parameters for comparison with the user input message. In order to do so, the tutorial monitor must obtain the handle of the product window. In steps 250 and 252, the tutorial monitor uses the object identifiers specified as parameters in the current action of the lesson control table to get the handle of the window to which the user input message should be directed. This is done using the standard OS/2 TM call "WinQueryWindow". In step 254, the tutorial monitor uses the command structure identified in step 236 to arrange the associated message parameters from the lesson control table to create a message structure for comparison with the actual input message. This message structure includes the window handle obtained in step 252. The comparison of messages is performed in step 256. If the comparison shows a match between the current input message and the input message formulated from the lesson control table, the lesson pointer in the lesson control table is updated in step 258 and a "False" message is returned to the system message queue in step 260. This allows the user input message to reach the product. If comparison step 256 reveals a mismatch, an error message is displayed in step 262 and the user input is discarded in step 264 by returning a "True" message to the system message queue. The process the returns to step 224 to wait for further user input. Advantageously, the error message displayed in step 262 is a Presentation Manager TM Dialog Box. A Dialog Box is an input window which is created using a Presentation Manager TM window authoring facility. In step 262, an input window is displayed that offers students the choice of cancelling the message to try input again, deactivating the monitoring function or requesting show-me assistance.

User Assistance

The third function provided by the tutorial to help users explore the product is referred as the "show-me" function. The tutorial shows users what to do in a lesson by actually driving the product to perform the actions in a lesson. Users can request this function when they do not understand how to perform a task themselves. It is like providing an assistant who shows users what to do. This function is also useful for demonstration purposes. Users can request the show-me function at three levels. They can request the tutorial to perform all the actions for a lesson by selecting the show-me function from the pull-down menu in the tutorial's action bar. They can also request all the actions for a particular step in a lesson by selecting a show-me button on the step window. Finally, from the error message that the tutorial monitor displays, users may request the tutorial to perform the correct next action by selecting the show-me button on the message box. The tutorial performs the show-me function using the multi-tasking message passing capabilities of OS/2. The tutorial and the product communicate with each other through a standard message passing protocol or through Presentation Manager's dynamic data exchange (DDE). Through this communication, the tutorial sends messages to the product requesting the product to perform the actions in a lesson.

Figure 11:
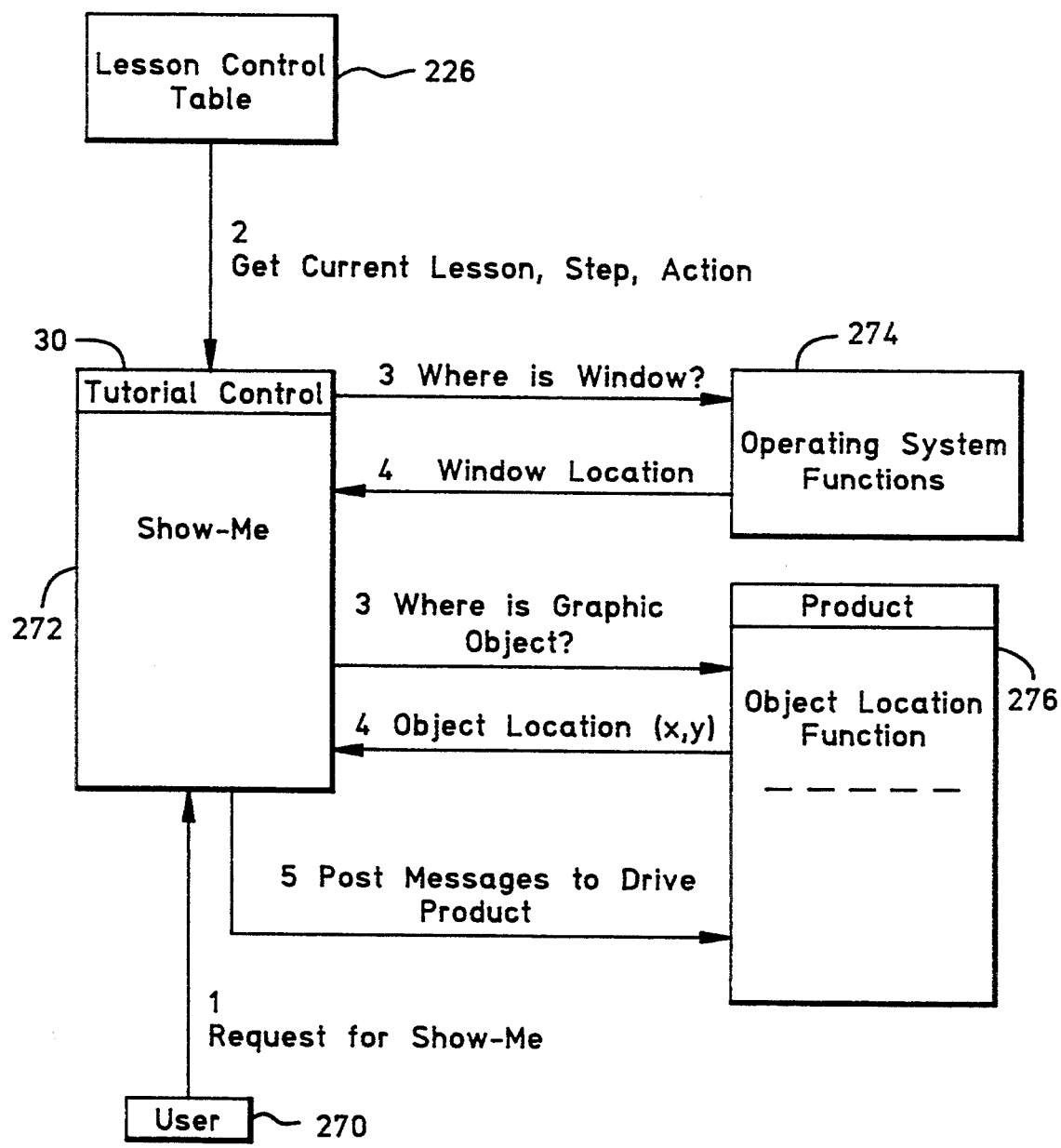
FIG. 11 is a diagram showing message flow during the user assistance function performed by the tutorial system of FIG. 1.

The lesson control table is used for the show-me function. As previously described, this table consists of commands that correspond to the product's actions. These actions are grouped by steps within lessons. The tutorial keeps track of the current lesson, current step and current action using a lesson control pointer. In the show-me mode, the tutorial sends appropriate commands to the product. Message flow during the tutorial's show-me function is illustrated in FIG. 11. As shown therein, a user 270 makes a request for assistance which is input to the tutorial control module 30. A tutorial show-me module 272 handles the show-me request. It obtains the current lesson, step and action from the lesson control table 226. The tutorial show-me module 272 utilizes operating system functions 274 to locate the lowest level window in the product, which represents the location at which user input is required by the product. If user input is being requested by the product from some form of graphic input object other than a window, the tutorial show-me module 272 requests from the product 276 the location of the graphic input object by using the object name specified in the current action of the control table as a parameter for a request to a product function for locating such objects. Once this information is obtained, the tutorial show-me module 272 posts messages to drive the product.

Figure 12A:
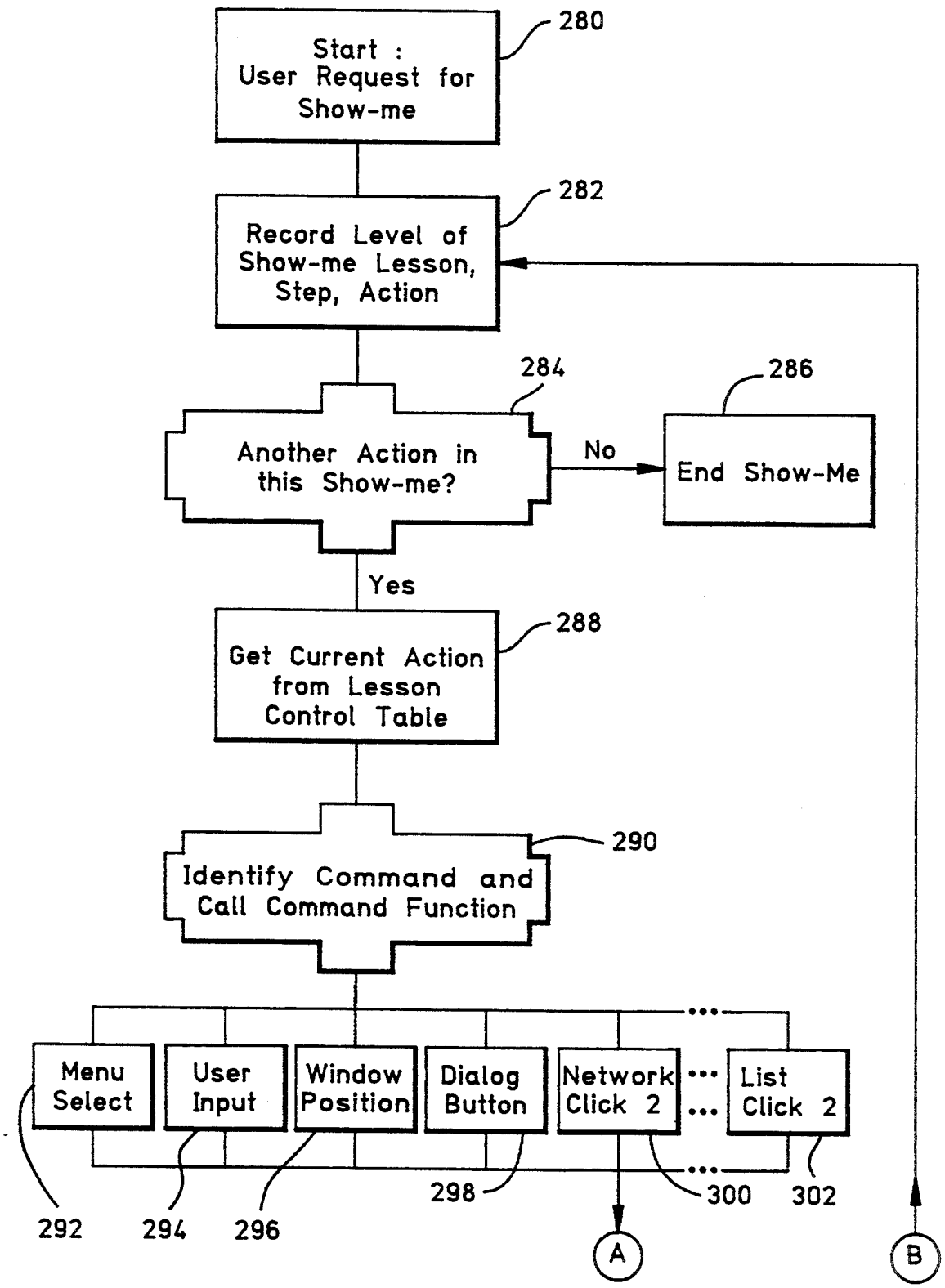
FIG. 12a is a first portion of a diagram showing logic flow during the user assistance function performed by the tutorial system of FIG. 1.
Figure 12B:
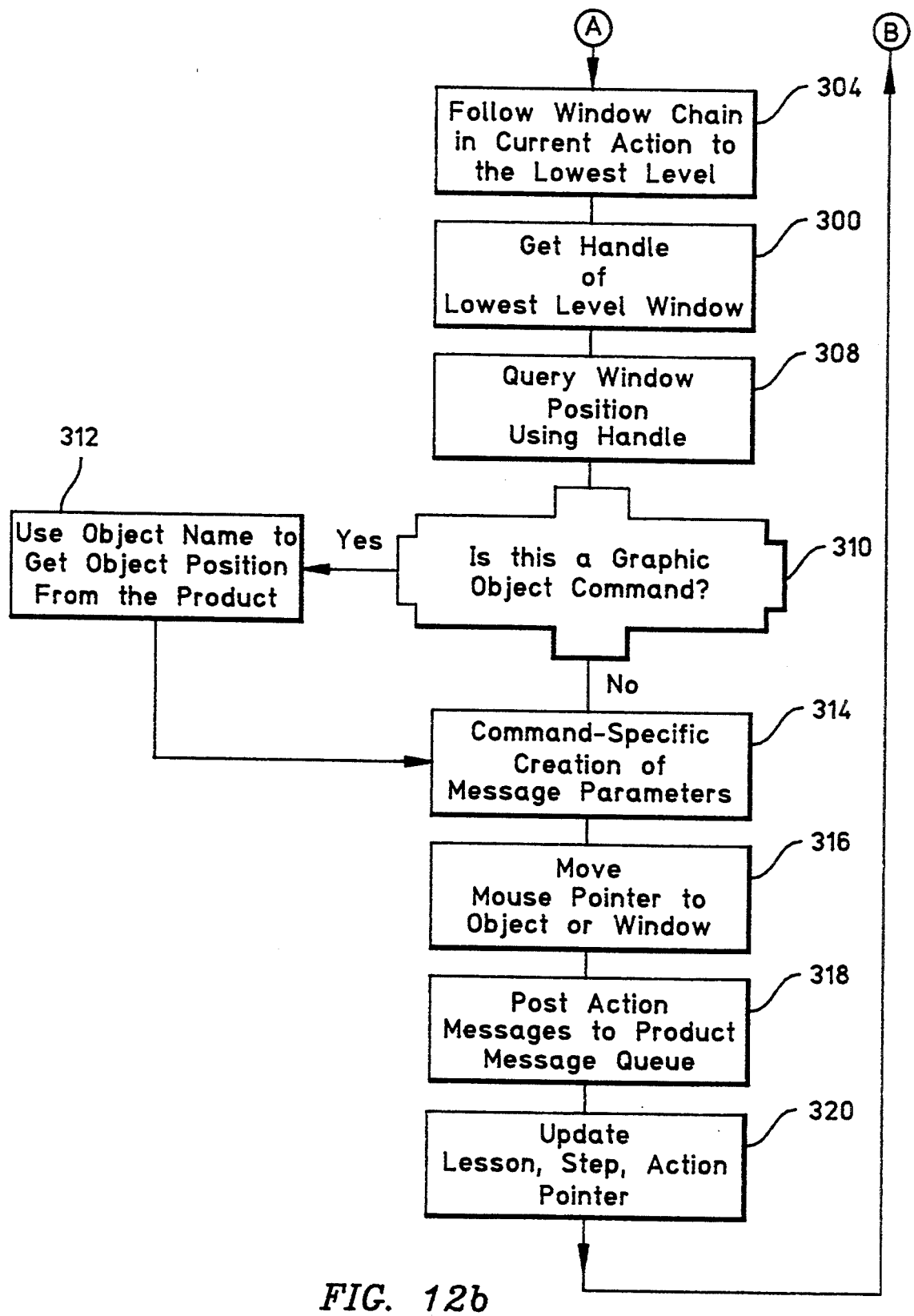
FIG. 12b is a second portion of a diagram showing logic flow during the user assistance function performed by the tutorial system of FIG. 1.

Logical flow of the tutorial show-me function is illustrated in FIGS. 12a and 12b. Beginning with step 280, the user requests the show-me module to provide user assistance. In step 282, the tutorial show-me module determines the lesson, step and action level at which the show-me request was made. This information is determined from the input message generated when the user requests assistance. If assistance is requested from a step panel, an inform message (2222) is sent to the tutorial, as described above. Other messages are sent when assistance is requested from the "Show Me" action of the "Options" pull-down menu. In step 284, the tutorial show-me module determines whether another action is to be taken. If not, the show-me function is terminated in step 286. If another show-me action is to be taken, the show-me module obtains the current action from the lesson control table in step 288. The action statement at which the tutorial show-me module terminates the show-me function depends whether assistance is requested at the lesson, step or action level. If lesson level assistance is requested, the tutorial show-me module steps through the lesson control table action entries for that lesson until no further steps are encountered. If step level assistance is required, the show-me module steps through the lesson control table action entries for that step until no further actions are found. Action level assistance terminates after a single action is performed. In step 290, the show-me module identifies the command function from the lesson control table in accordance with the selections of steps 292-302 and determines the appropriate OS/2 TM message structure. The show-me module then uses the window identifiers specified as parameters in the current action of the lesson control table to identify in step 304 the window to which show-me messages will be sent and obtains the handle of that window in step 306. The OS/2 TM call "WinQueryWindow" conveniently provides this window handle. In step 308, the tutorial show-me module determines the position of the window identified in step 304. The show-me module determines whether the action is a graphic object command in step 310. If it is, the show-me module uses the object name to obtain the object position from the product using conventional Presentation Manager TM calls. This occurs in step 312. Upon obtaining the object position, or if the action is not a graphic object command, the show-me module arranges the command message parameters in step 314 in accordance with the command message structure determined in step 290. In step 316, the show-me module moves the mouse pointer to the relevant graphic object or window, and in step 318 posts an appropriate message to the product message queue. The show-me module then updates the tutorial control pointer in step 320 and returns to step 282.

It should be noted that user input actions requiring mouse operations are performed by the tutorial show-me module by generating appropriate messages which drive the product in lieu of actual mouse input. Nonetheless, it is desirable to show students graphically how the mouse should be operated to enter the required input. The tutorial thus controls and simulates mouse movement using Presentation Manager TM calls. The tutorial uses the "WinSetPointerPos" call to determine the required movement of the mouse pointer icon based on the current position of the pointer and the destination point. The "WinQueryWinPos" call is used to obtain the destination position of various objects. The returned coordinates are relative to the window. The "WinMapWindowPos" call maps the relative window coordinates to the absolute screen coordinates. The tutorial then needs to calculate the ratio of x coordinate movement to the y coordinate movement to reach the destination point. To simulate actual mouse movement by a user, the mouse pointer is moved a pixel at a time in either x or y direction. Also, in order for the mouse movement rate to be consistent, a wait value is calculated, depending on the ratio of the x and y values and is applied to the pointer movements. The result is a smooth and consistent speed of mouse movement.

Interprocess communication between the tutorial and the product allows the tutorial to send messages to the product requesting the performance of actions for the show-me function. In the preferred embodiment, this communication is established by sending messages to the product using OS/2 TM calls and Presentation Manager commands. The OS/2 TM command "WinQueryWindow" is used to get the product window handle. The "WinQueryWindow" and object location messages such as "WM_COMMANDS" (window commands) are posted directly to the product to perform actions. If a parameter of a message sent directly to the product contains a pointer to data in memory, a "DosGiveSeg" call is used to give the product access to t he memory segment containing that data. Advantageously, this communication exchange requires no changes to the product's code.

In another embodiment, communication between the tutorial and the product is established using DDE (Dynamic Data Exchange), a Presentation Manager TM interprocess communications protocol using a shared data structure, DDESTRUCT. The tutorial is the "client" application and the product is the "server" application. When Dynamic Data Exchange is employed, the tutorial, upon first becoming active, establishes a conversation with the product using the following protocol:

1. WinDdeInitiate call. The tutorial issues a "WinDdeInitiate" call. This causes a "WM_DDE_INITIATE" message to be sent to all top level windows, including the product, informing them that tutorial wants to start a DDE conversation.
2. WinDdeRespond call. Upon receiving the "WM_DDE_INITIATE" message from the tutorial, the product accepts the DDE conversation by issuing a "WinDdeRespond" call. This call causes the "WM_DDE_INITIATEACK" message to be sent to the tutorial.
3. WM_DDE_ADVISE message. Upon receiving the "WM_DDE_INITIATEACK" message, the tutorial sends a "WM_DDE_ADVISE" message to the product to confirm that the conversation has been established.

After a DDE conversation has been setup, the tutorial instructs the product to perform actions by sending it "WM_DDE_EXECUTE" messages referencing the shared DDE data structure "DDESTRUCT" that contains the details of actions. The DDESTRUCT field in the DDE_EXECUTE message is a pointer to a block of shared variable-size memory that contains the details of each command (from the tutorial to the product). The fields in DDESTRUCT are: (in sequential memory order)

cbData—length(variable) of the DDESTRUCT in bytes.

fsSTatus—Status of data exchange. For DDE_EXECUTE messages, this field should contain the bit fields DDE_ACK and DDE_FACREQ, which indicate whether the server was able to execute the command.

usFormat—Data format. The tutorial defines its own data formats by registering the name of the format in a system atom table. This method ensures that all applications use the same atom to identify a format. This field will represent the show-me command that the product should execute. For example, "Menu Select" will translate to an atom number generated during runtime.

offszItemName—offset to the item name (string), from the start of the structure.

offabData—offset to the data, from the start of the structure.

ItemName—item name referred to in the message (should be 'tutorial').

Data—variable size data area being passed in the message. This part of the data structure contains the Action structure which describes the show-me action to be performed. It has the following fields:

| | |
|---|---|
| command-type (int) | - static command id |
| command-atom (int) | - unique dynamic command id |
| paramx" | - "x" parameters |
| data (char") | - variable size field containing string data |
| tag (char") | - variable string data for |

-continued documentation

When the show-me function is requested by the user, the tutorial sends the product a DDE command containing an 'Action' structure. Upon receiving the DDE command, a DDE handler module on the product side performs the requested action. The module that handles the DDE processing for the product is contained in a separate object file, which must be created and linked into the product. The DDE code does not impact any other part of the product code. However, DDE communication does require this modification to the product.

Accordingly, an interactive, online tutorial system has been disclosed wherein improved information presentation, input monitoring and user assistance functions are provided. Although several preferred embodiments have been shown and described, it will be understood that modifications and adaptations thereof will occur to persons skilled in the art. Therefore, the protection afforded the invention should not be limited except in accordance with the spirit of the following claims and their equivalents.

We claim:

1. An interactive online tutorial system for providing information in the use of a non-simulation software product operating [separately but]concurrently on a digital processing apparatus with said tutorial system, said software product and said tutorial system operating running as separate executable application file processes, said software product generating a product display window with user interface controls therein, the digital processing apparatus including an instruction processing unit, a data storage resource, an input system for receiving data input from a user, and an output system including a video display for providing data output to a user, said tutorial system comprising:

display control means for generating a tutorial display window in a first portion of said video display for displaying tutorial lesson information generated by said tutorial system;

software product control means for controlling said product display window to appear in a second portion of said video display for displaying said user interface controls generated by said software product;

information presentation means for presenting tutorial lesson information in said tutorial display window, said tutorial lesson information including descriptions of user input lesson actions required for operation of said software product displayed in said product window, said tutorial lesson information being arranged in a hierarchy of lesson, step and action levels;

tutorial assistance means for sending messages to said software product to manipulate said user interface controls and drive said software product to respond as if a user had performed said user input lesson actions specified in said tutorial lesson information, said tutorial assistance means including a lesson control table containing action command statements corresponding to said messages;

first assistance request means for activating said user assistance means in response to a user request for assistance, said assistance request means including selection means for requesting assistance for a selected one of said lesson, step and action levels of said tutorial lesson information;

second assistance request means including a graphical display button for activating said user assistance means in response to said user request for assistance, said second assistance request means including means for displaying said graphical display button upon an erroneous input action being taken by a user.

2. An interactive online tutorial system product operable in conjunction with a digital processing apparatus in a first multi-tasking session for providing instruction in the use of a non-simulation software product operating in a separate but concurrently executing second multi-tasking session on said [a]digital processing apparatus in conjunction with said tutorial system product, said software product generating a product display window with user interface controls therein, said digital processing apparatus including an instruction processing unit, a data storage resource, an input system for receiving input from a user, an output system including a video display for providing data output to said user, and a multi-tasking operating system which concurrently operates one or more multi-tasking sessions and communicates user input actions from said input system via messages to said multi-tasking sessions installed and running under said operating system, said tutorial system comprising:

a data storage medium operable in conjunction with said digital processing apparatus;

display control means encoded on said medium for generating a tutorial display window in a first portion of said video display for displaying tutorial lesson information generated by said tutorial system;

software product control means encoded on said medium for controlling said product display window to appear in a second portion of said video display for displaying said user interface controls generated by said software product;

information presentation means encoded on said medium for presenting said tutorial lesson information in said tutorial display window, said tutorial lesson information including descriptions of user input lesson actions required for operation of said software product displayed in said product window;

tutorial assistance means encoded on said medium for sending operating system messages to said software product to manipulate said user interface controls and drive said software product to respond as if a user had performed said user input lesson actions specified in said tutorial lesson information; and assistance request means encoded on said medium for activating said user assistance means in response to a user request for assistance, said assistance request means including selection means for requesting assistance for a selected number of said user input lesson actions described in said tutorial lesson information.

3. The tutorial system of claim 2 wherein said tutorial assistance means includes a lesson control table containing command action statements corresponding to said user input actions set forth in said tutorial lesson information.

4. The tutorial system of claim 3 wherein said tutorial assistance means includes message means for generating operating system messages from lesson actions described by command, product interface identifiers and data.

5. The tutorial system of claim 4 wherein said conversion means includes locating means for locating positions in said product window where input is required by said software product, and wherein said conversion means incorporates position information determined by said locating means in said product control actions.

6. The tutorial system of claim 2 wherein said tutorial lesson information is presented in predetermined levels of information and said assistance request means includes selection means for requesting assistance at selected levels of said tutorial lesson information.

7. The tutorial system of claim 2 wherein said tutorial lesson information is presented as a hierarchy of lesson, step and action levels, and said assistance request means includes selection means for requesting assistance at a selected one of said levels of said tutorial information.

8. The tutorial system of claim 2 wherein said assistance request means include hypertext or hypergraphic link elements displayed in said tutorial lesson information for requesting assistance for selected tutorial lesson information.

9. The tutorial system of claim 2 wherein said tutorial lesson information is displayed as a series of text panels and wherein said assistance request means includes hypertext or hypergraphic link elements displayed in said tutorial text panels for requesting assistance for tutorial lesson information contained in said tutorial text panels.

10. The tutorial system of claim 2 wherein said tutorial information is presented in predetermined levels of information and said assistance request means includes input action elements displayed in a pull-down menu corresponding to levels of said tutorial lesson information.

11. The tutorial system of claim 2 further including mouse simulation means for simulating movement of a mouse pointer icon in said product display window before sending said operating system messages to said software product.

12. An interactive online tutorial method for providing instruction in the use of a non-simulation software product operating on a digital processing apparatus as an executable multi-tasking process, said software product generating a product display window with user interface controls therein, the digital processing apparatus including an instruction processing unit, a data storage resource, an input system for receiving data input from a user, and an output system including a video display for providing data output to a user, said tutorial method comprising the steps of:

generating a tutorial display window in a first portion of said video display for displaying tutorial lesson information generated by a tutorial software program operating on said digital processing apparatus separately but concurrently with said software product as an executable multi-tasking process;

controlling said product display window to appear in a second portion of said video display for displaying said user interface controls generated by said software product;

presenting tutorial lesson information in said tutorial display window, said tutorial lesson information including descriptions of user input lesson actions required for operation of said software product displayed in said product window; and in response to a user request for assistance, providing user assistance by sending messages to said software product to manipulate said user interface controls and drive said software product to respond as if a user had performed a selected number of said user input lesson actions described in said tutorial lesson information.

13. The tutorial method of claim 12 further including the step of providing a lesson control table containing command action statements corresponding to user input actions set forth in said tutorial lesson information.

14. The tutorial method of claim 13 further including the step of generating said messages from said command action statements in response to a request for assistance.

15. The tutorial method of claim 14 further including the step of locating positions in said product window where input is required by said software product, and incorporating position information determined by said locating means in said product control actions.

16. The tutorial method of claim 12 further including the steps of presenting tutorial lesson information in predetermined levels of information and providing assistance at selected levels of said tutorial lesson information.

17. The tutorial method of claim 12 further including the steps of presenting said tutorial lesson information as a hierarchy of lesson, step and action levels, and providing assistance at a selected one of said levels of said tutorial information.

18. The tutorial method of claim 12 further including the step of providing hypertext or hypergraphic link elements in said tutorial lesson information for requesting assistance for a selected tutorial lesson information.

19. The tutorial method of claim 12 further including the step of displaying said tutorial lesson information as a series of text panels and providing hypertext or hypergraphic link elements in said tutorial text panels for requesting assistance for said tutorial lesson information contained in said tutorial text panels.

20. The tutorial method of claim 12 further including the step of presenting said tutorial lesson information in predetermined levels of information and displaying input action elements in a pull-down menu corresponding to levels of said tutorial lesson information.

21. The tutorial method of claim 12 further including the step of simulating movement of a mouse pointer icon in said product display window before sending said messages to said software product.

* * * * *

UNITED STATES PATENT AND TRADEMARK OFFICE
CERTIFICATE OF CORRECTION

PATENT NO. : 5,442,759
DATED : August 15, 1995
INVENTOR(S) : A. Chiang et al

It is certified that error appears in the above-indentified patent and that said Letters Patent is hereby corrected as shown below:

Col. 7, line 47, change "." to -- - -- between "Cycle" and "The"

Col. 23, line 29, delete "[" and "]".

Col. 24, line 15, delete "[a]"

Signed and Sealed this

Second Day of January, 1996

Attest:

BRUCE LEHMAN

*Attesting Officer*     *Commissioner of Patents and Trademarks*